US012794708B1

(12) United States Patent
Stornetta et al.

(10) Patent No.: US 12,794,708 B1
(45) Date of Patent: Nov. 10, 2026

(54) APPARATUS AND METHOD FOR ESTABLISHING A DIGITAL IDENTITY AS A FUNCTION OF AT LEAST A DIGITAL SIGNATURE AND ATTESTATION METRICS

(71) Applicants: W. Scott Stornetta, Morristown, NJ (US); Cory Francis Poor Myers, Seattle, WA (US); Stuart Haber, New York, NY (US)

(72) Inventors: W. Scott Stornetta, Morristown, NJ (US); Cory Francis Poor Myers, Seattle, WA (US); Stuart Haber, New York, NY (US)

( * ) Notice: Subject to any disclaimer, the term of this patent is extended or adjusted under 35 U.S.C. 154(b) by 140 days.

(21) Appl. No.: 19/065,782

(22) Filed: Feb. 27, 2025

Related U.S. Application Data

(60) Provisional application No. 63/749,336, filed on Jan. 24, 2025, provisional application No. 63/558,316, filed on Feb. 27, 2024.

(51) Int. Cl.
*H04L 9/32* (2006.01)

(52) U.S. Cl.
CPC .................................. *H04L 9/3247* (2013.01)

(58) Field of Classification Search
CPC ..................................................... H04L 9/3247
(Continued)

(56) References Cited

U.S. PATENT DOCUMENTS 8,782,401 B2 * 7/2014 Sarangdhar ........... H04L 9/3234
380/44
9,635,000 B1 4/2017 Muftic
(Continued)

FOREIGN PATENT DOCUMENTS

CA 2886548 A1 9/2015
CN 117216740 A 12/2023
EP 4092958 A1 11/2022

OTHER PUBLICATIONS

Ahmed et al "Blockchain-Based Identity Management Systemand Self-Sovereign Identity Ecosystem:A Comprehensive Survey" "IEEE AccessReceived Aug. 18, 2022, accepted Oct. 11, 2022, date of publication Oct. 25, 2022, date of current version Nov. 3, 2022."
(Continued)

*Primary Examiner* — Amare F Tabor
(74) *Attorney, Agent, or Firm* — CALDWELL LLC

(57) ABSTRACT

An apparatus and method for establishing a digital identity as a function of at least a digital signature and attestation metrics. The apparatus includes a computing device configured to authenticate a first digital identity as a function of event data and a public key, authenticating comprises using attestation metrics and circuitry communicatively connected to the computing device configured to receive a first attestation input associated with a first digital identity of a plurality of digital identities, identify first attestation metrics associated with the first digital identity, receive at least a second attestation input associated with at least a second digital identity of the plurality of digital identities, identify second attestation metrics associated with the at least a second digital identity, authenticating the first digital identity as a function of the first digital signature, the second digital signature, the first attestation metrics, and the second attestation metrics.

18 Claims, 6 Drawing Sheets

(58) Field of Classification Search
USPC .......................................................... 713/156
See application file for complete search history.

(56) References Cited

U.S. PATENT DOCUMENTS

| | | | | |
|---|---|---|---|---|
| 10,742,421 | B1 * | 8/2020 | Wentz | H04L 9/0897 |
| 10,803,205 | B1 * | 10/2020 | Yu | H04L 9/0637 |
| 10,887,098 | B2 | 1/2021 | Van Der Velden et al. | |
| 11,171,781 | B2 | 11/2021 | Khan | |
| 11,367,094 | B2 * | 6/2022 | Moreno Molina | H04L 9/3247 |
| 11,943,370 | B2 * | 3/2024 | Weeden | G06F 21/629 |
| 12,206,782 | B2 * | 1/2025 | Holmes-Mitra | H04L 9/088 |
| 12,368,600 | B2 * | 7/2025 | Wang | H04L 9/3213 |
| 2022/0038272 | A1 * | 2/2022 | Hershman | H04L 9/0866 |
| 2024/0313985 | A1 * | 9/2024 | Such Vicente | G06F 21/44 |

OTHER PUBLICATIONS

Nandhagopal Balasubramaniam "Blockchain Based Digital Identityverification for Social Media" Preprint • Dec. 2020.

* cited by examiner

400a

400b

400c

400e

400f

APPARATUS AND METHOD FOR ESTABLISHING A DIGITAL IDENTITY AS A FUNCTION OF AT LEAST A DIGITAL SIGNATURE AND ATTESTATION METRICS

CROSS-REFERENCE TO RELATED APPLICATIONS

This application claims the benefit of priority of U.S. Provisional Patent Application Ser. No. 63/558,316, filed on Feb. 27, 2024, and titled "METHOD AND APPARATUS FOR ESTABLISHING IDENTIFY VIA SOCIAL AND FAMILIAL NETWORKS," and U.S. Provisional Patent Application Ser. No. 63/749,336, filed on Jan. 24, 2025, and titled "PUBLICLY VERIFIABLE DIGITAL IDENTITIES," which are incorporated by reference herein in their entirety.

FIELD OF THE INVENTION

The present invention generally relates to the field of cryptography and computer security. In particular, the present invention is directed to an apparatus and a method for establishing a digital identity as a function of at least a digital signature and attestation metrics.

BACKGROUND

Existing digital identity systems often rely on centralized authorities or siloed verification processes, which introduce single points of failure, vulnerability to data breaches, and limited interoperability across platforms. Additionally, traditional authentication mechanisms, such as password-based or single-factor verification, fail to provide a robust framework for establishing trust, revoking compromised credentials, and dynamically adapting to evolving security threats in decentralized environments. Existing systems are also susceptible to fraudulently created identities generated by stealing information of valid users.

SUMMARY OF THE DISCLOSURE

In an aspect, an apparatus for establishing a digital identity as a function of at least a digital signature and attestation metrics. The apparatus includes at least a computing device, wherein the computing device comprises authenticating, using a plurality of open nodes, a first digital identity as a function of event data and a public key, wherein authenticating further comprises authenticating using attestation metrics, and circuitry communicatively connected to the computing device, wherein the circuitry is configured to receive a first attestation input associated with a first digital identity of a plurality of digital identities, wherein the first attestation input comprises event data and a first digital signature associated with a first unique keypair, and the digital signature signs a representation of the first event data, identify first attestation metrics associated with the first digital identity, receive at least a second attestation input associated with at least a second digital identity of the plurality of digital identities, wherein the second attestation input comprises a second digital signature signing the first attestation input, and the second digital signature is signed using a second unique keypair distinct from the first unique keypair, identify second attestation metrics associated with the at least a second digital identity, authenticating, using the plurality of digital identities, the first digital identity as a function of the first digital signature, the second digital signature, the first attestation metrics, and the second attestation metrics.

In another aspect, a method for establishing a digital identity as a function of at least a digital signature and attestation metrics. The method includes receiving, using circuitry, a first attestation input associated with a first digital identity of a plurality of digital identities, wherein the first attestation input comprises event data and a first digital signature associated with a first unique keypair, and the digital signature signs a representation of the first event data, identifying, using the circuitry, first attestation metrics associated with the first digital identity, receiving, using the circuitry, at least a second attestation input associated with at least a second digital identity of the plurality of digital identities, wherein the second attestation input comprises a second digital signature signing the first attestation input, and the second digital signature is signed using a second unique keypair distinct from the first unique keypair, identifying, using the circuitry, second attestation metrics associated with the at least a second digital identity, authenticating, using the plurality of digital identities, the first digital identity as a function of the first digital signature, the second digital signature, the first attestation metrics, and the second attestation metrics.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for establishing a digital identity as a function of at least a digital signature and attestation metrics. Aspects of the disclosed embodiments may use network-based consensus to confirm and authenticate links between a digital identity and the person or entity it purports to identify, for instance using a plurality of digital signatures indicating endorsement or negation of such links to event data. Scoring and endorsement may be preserved using tamperproof cryptographic primitives, creating a rapidly verifiably authentication process that was not possible to perform previously. Embodiments disclosed herein also improve user interface technology by creating a category of authentication-related display that did not previously exist; for instance, a user of a web browser currently can verify that a website is using up to date hypertext transfer protocol-secure (HTTPS) security, but cannot verify the identity of the entity, vendor or person behind the website. This is a uniquely difficult challenge in electronic communication, where spoofing cannot be readily compared to real-life environs and direct examination of products, locations, or persons is impossible. Embodiments described herein provide ways to detect and warn users regarding fraudulent identities behind ostensibly secure platforms.

Figure 1:
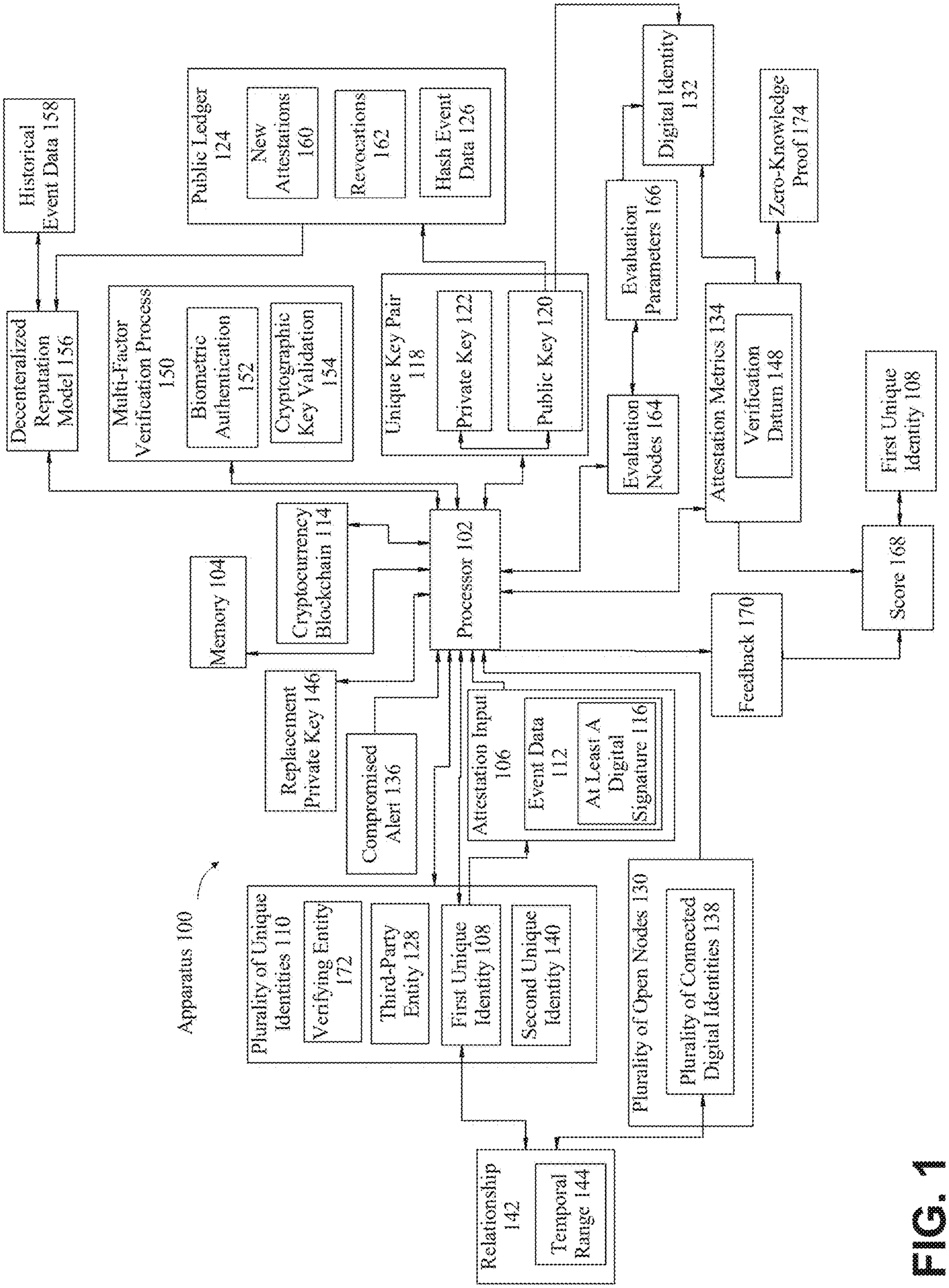
FIG. 1 is a block diagram of an apparatus for establishing a digital identity as a function of at least a digital signature and attestation metrics.

Referring now to FIG. 1, an exemplary embodiment of apparatus 100 for establishing a digital identity as a function of at least a digital signature and attestation metrics is illustrated. Apparatus 100 may include a circuitry such as without limitation a processor communicatively connected to a memory 104. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein circuitry 102 may access the information from primary memory.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed, and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting circuitry 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Circuitry 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, circuitry 102 may be designed and/or configured to perform any method, method step, or sequence of method steps in any embodiment described in this disclosure, in any order and with any degree of repetition. For instance, circuitry 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Circuitry 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the at least a computing device includes authenticating, using a plurality of open nodes, a first digital identity as a function of event data and a public key, wherein authenticating further comprises authenticating using attestation metrics and circuitry communicatively connected to the computing device. As used in this disclosure, an "open node" is a computing device, virtual machine, or system component, including without limitation any system or apparatus as described in this disclosure, that is registered to a person and/or entity within a system. An open node may serve as an interface for interaction within the system, facilitating communication, computation, or transaction processing while maintaining an association with its registered user. In a non-limiting example, an open node may include a network node that is accessible or configurable by users or external entities. Continuing, this may mean a node in a network topology where data can be freely routed, or where third-party applications can interface with it. Without limitation, an open node may operate with some level of transparency, interoperability, or accessibility.

With continued reference to FIG. 1, as used in this disclosure, a "digital identity" is a data value such as a number, textual string, or other data structure that uniquely identifies an entity such as a person, device, organization, or the like. A digital identity may include a "verified identity" that has undergone a process of authentication, such as without limitation processes as described in this disclosure. In an embodiment, the digital identity 132 may include a digital representation of an individual, organization, or device which can be authenticated and trusted within a system.

With continued reference to FIG. 1, as used in this disclosure, "event data" is representing actions by or connected to a person and/or entity identified by a digital identity. Event data 112 may include, without limitation, online account activity, such as logging into an account, updating profile information, or modifying security settings. Continuing, event data 112 may include content-related actions, such as posting a comment, uploading a file, or sharing a document. Additionally and/or alternatively, event data 112 may include system transactions, such as executing a smart contract, authorizing a payment, and/or transferring digital assets. In some cases, event data 112 may reflect user engagement metrics, such as viewing a specific page, clicking a link, and/or interacting with an application feature. Event data 112 may include security-related events, such as failed login attempts, multi-factor authentication verifications, or permission changes. Without limitation, event data 112 may include blockchain interactions, such as signing a digital message, recording a cryptographic hash, or inscribing metadata onto a distributed ledger. Continuing, event data 112 may serve as a comprehensive record of user interactions and system events, enabling auditability, verification, and analysis. In addition to blockchain-related actions, event data 112 may include various forms of media, including digital images, video, audio recordings, sensor data, other data generated from real-world events, and the like. For instance, without limitation, event data 112 may include timestamped photographs or videos captured by a device, audio logs from recorded conversations or system interactions, or sensor data from IoT devices that detect motion, temperature, or other environmental conditions. Continuing, event data 112 may represent real-world occurrences that are cryptographically recorded or attested to, such as biometric authentication logs, GPS location records, or identity-verification scans. These data points may be processed, hashed, or digitally signed by the system to ensure integrity, authenticity, and verifiability.

Still referring to FIG. 1, event data may include, without limitation, data storing and/or representing creative content produced by a person or entity, such as written works or other text, images, audio and/or video recordings, artworks, digital creations, or the like. Event data may include transactions such as commercial transactions, purchases, sales, financial transactions, communications between persons or entities via any electronic or other means, online posting or interaction histories, user or entity profiles on any website or other location, information describing educational or professional actions, occurrences, affiliations, or achievements, information describing relationships with other persons or entities, information describing real estate transactions, holdings, liens, covenants, casements, or agreements, information regarding domestic animals or plants, information describing businesses owned or collaborated with by a person or entity, club or other memberships, or any other examples that may occur to a person skilled in the art upon reviewing the entirety of this disclosure. Any subject of event data may be represented by or in event data by recording digital versions and/or representations thereof, data that has been cryptographically hashed, cryptographically accumulated, or otherwise derived from digital representations of event data, and/or identifiers of event data such as without limitation a universal resource identifier (URI), uniform resource locator (URL), international standard book number (ISBN), a transaction identifier, or other identifier that may be used to identify any kind of event data as disclosed in this disclosure.

Further referring to FIG. 1, in an embodiment, a user, person or entity may digitally sign event data representing events as they occur; for instance, online transactions such as purchases, communications, modifications to user profiles, postings or modifications of creative content, social media postings, or the like, may be signed automatically by a plug-in on a web browser used by the user or entity, or a native application or module operated by or on behalf of a user or entity. For instance, when a user purchases an item online or in a store, a device associated with the purchasing user and/or a vendor of the item may digitally sign the transaction and/or information linked to the digital identity of the purchaser or vendor, via a plug-in or other program and/or module, such as a module or program linked to a user's mobile payment application. Any or all such signed event data may be posted to an immutable sequential listing as described in this disclosure.

With continued reference to FIG. 1, as used in this disclosure, a "public key" is a cryptographic identifier, such as a verification datum for a secure proof and/or a public key of a public key cryptographic system, that is mathematically linked to a corresponding private key 122, which may be any secret datum for instance as described below in relation to secure proofs. In an embodiment, the public key 120 may be used for encryption, authentication, or verification in a cryptographic system. The public key 120 may be openly shared, allowing other entities to encrypt messages, verify digital signatures, or authenticate transactions without exposing the associated private key 122. In asymmetric encryption, such as RSA, a sender may encrypt sensitive data using the recipient's public key 120, ensuring that only the corresponding private key 122 can decrypt it. In a blockchain system, the public key 120 may serve as an address for receiving cryptocurrency transactions, where a user may share their public key 120 to receive Bitcoin, Ethereum, or other digital assets. The public key 120 may also be used to verify a digital signature 116, such as when a smart contract checks whether a transaction was signed by an authorized entity before execution. In another non-limiting example, the public key 120 may be linked to a decentralized identity, enabling users to authenticate themselves without relying on a centralized authority. Additionally or alternatively, the public key 120 may be stored on a digital certificate in a Public Key Infrastructure (PKI), allowing entities to establish trust through certificate authorities that validate the legitimacy of the key owner.

With continued reference to FIG. 1, as used in this disclosure, a "private key" is a secret datum, such as a cryptographic key or secret to be proven using a secure proof, which may provide access to secured digital assets, authorizes transactions, or decrypts encrypted data, or be used as a basis for a digital signature. Without limitation, the private key 122 may be generated as part of a public-private key pair and may be intended to remain confidential, ensuring that only the authorized holder can sign transactions or access protected information. The private key 122 may be used in asymmetric encryption schemes, such as RSA or elliptic curve cryptography (ECC), to authenticate identities or enable secure communications. The private key 122 may be used to sign a cryptocurrency transaction, such as authorizing the transfer of Bitcoin from one wallet to another, ensuring that only the rightful owner can initiate the transaction. In a smart contract execution, the private key 122 may be required to confirm an on-chain action, such as approving a decentralized finance (DeFi) trade on the Ethereum blockchain. A hardware security module (HSM) may store the private key 122 in a tamper-resistant environment, preventing unauthorized access while enabling cryptographic operations. In end-to-end encrypted messaging, the private key 122 may be used to decrypt messages sent using a corresponding public key 120, ensuring that only the intended recipient can read the content. A multi-signature wallet may require multiple private keys to approve a transaction, adding an extra layer of security for digital asset management. In a certificate-based authentication system, the private key 122 may be used to generate a digital signature 116 that verifies a user's identity when accessing a secure network or website.

With continued reference to FIG. 1, as used in this disclosure, an "attestation metric" is a set of criteria used to evaluate and confirm the authenticity of a unique identity. The attestation metric may include quantitative data like scores, percentages, or time durations, and or qualitative assessments like compliance levels, security posture, or trust levels. Attestation metrics 134 may help in verifying that hardware or software components are operating as expected or have not been tampered with. In an embodiment, attestation metrics 134 may assess how well the unique identity meets predefined standards. In an embodiment, the attestation metrics 134 may ensure the validity of claims or the accuracy of data presented by the unique identity such as, without limitation, the input data. Without limitation, attestation metrics 134 may be derived from direct measurements, audits, third-party validations, or automated tests, providing a basis for trust and decision-making in digital environments. In an embodiment, attestation metrics 134 may be derived from the event data 112, which may include logs, timestamps, and or any form of digital footprint that provides evidence of actions or states of the first unique identity 108. Through this process, circuitry 102 may evaluate authenticity of first unique identity 108. For example, without limitation, plurality of open nodes 130 may act like a checkpoint or validator in a vast digital highway, where each node checks and cross-references the data against these metrics to ensure that the first unique identity 108 claiming to "John Smith" indeed matches the profile or behavior expected from the event data 112 and public key 120 association. Without limitation, this could mean verifying that the first unique identity 108 has not been tampered with, is performing within expected parameters, or genuinely belongs to the entity it claims to represent, all based on the detailed analysis of the event data 112 through these attestation metrics 134. In an embodiment, the plurality of open nodes 130 may generate a cryptographic hash of the received event data 112 and compare it against previously recorded or expected hash values stored within a cryptographic accumulator, a Merkle tree, or a distributed ledger. A mismatch may indicate that the data has been altered or is inauthentic. Without limitation, if the first unique identity 108 is associated with the unique keypair 118, the plurality of open nodes 130 may verify the at least a digital signature 116 linked to event data 112. This may include checking whether the claimed identity correctly signs data using the private key corresponding to public key 120. In an embodiment, the plurality of open nodes 130 may retrieve and analyze past interactions, transactions, or behavioral patterns associated with the first unique identity 108. Continuing, if the observed behavior deviates significantly from prior attested records, it may indicate fraud or misrepresentation. In some embodiments, the plurality of open nodes 130 may collectively reach a consensus on the validity of the first unique identity 108 by cross-verifying independent attestations generated by multiple nodes. Continuing, this may involve techniques such as majority voting, stake-weighted validation, or Byzantine fault-tolerant protocols. After processing the attestation input 106, the apparatus 100 may aggregate and evaluate the attestations received from the plurality of open nodes 130. Without limitation, attestations may be stored in the immutable ledger for future reference, while an aggregated score 168 may be generated based on the number of validating nodes and the strength of their attestations, enabling the issuance of a certificate or token representing the verified status of the first unique identity 108 for future interactions, with any inconsistencies or discrepancies among the plurality of open nodes 130 being flagged for further review to ensure data integrity and reliability.

With continued reference to FIG. 1, attestation metrics 134 may be implemented through cryptographic processes performed by the plurality of open nodes 130 within the system. The plurality of nodes 130 may hash event data 112, sign event data 112, or sign hashes to generate cryptographic proofs that verify identity attributes without exposing underlying sensitive information. For example, without limitation the plurality of open nodes 130 may generate a hash of identity-related data and store it within a cryptographic accumulator, enabling efficient and verifiable membership proofs. Additionally or alternatively, the plurality of open nodes 130 may digitally sign a hash of event data 112 using the private key 122 to create an attestation signature, allowing the third-party entities 128 to verify authenticity using the corresponding public key 120. These cryptographic operations may support decentralized verification, enabling trust without requiring a central authority. Attestation metrics 134 may further leverage ZKPs to enable privacy-preserving identity verification, where the plurality of open nodes 130 may prove that the first unique identity 108 meets certain identity criteria without revealing the actual identity data.

Still referring to FIG. 1, the circuitry 102 is configured to receive a first attestation input associated with a first digital identity of a plurality of digital identities, wherein the first attestation input comprises event data and a first digital signature associated with a first unique keypair and the digital signature signs a representation of the first event data. As used in this disclosure, "attestation input" is data, commands, and/or interactions used to select an identity for attestation. The attestation input 106 may be associated with a first unique identity 108 of a plurality of unique identities 110 and may include event data 112, which serves as the basis for attestation. Event data 112 within the attestation input 106 may encompass information relevant to verifying an event, such as timestamps, cryptographic signatures, identity-related metadata, transactional details, and the like. System may process the attestation input 106 by hashing, signing, or otherwise securing the event data 112 through cryptographic means, allowing for validation by the plurality of open nodes 130 within the system. Attestation input 106 may include, without limitation, identifying information used to generate a unique identity, such as a username, email address, biometric data, cryptographic key, or other authentication credentials. Additionally and or alternatively, attestation input 106 may include activity associated with the unique identity, including but not limited to, event data 112 such as transaction details, digital signatures, timestamps, and/or interactions within the apparatus 100. For example, without limitation, attestation input 106 may include submitting a request to inscribe event data 112 onto a blockchain, signing a digital document, executing a smart contract function, and/or updating account settings. Without limitation, attestation input 106 may include selections made through a graphical user interface, such as clicking a button to approve a transaction, entering a password for verification, and/or confirming an action within a system.

With continued reference to FIG. 1, a "digital signature," as used herein, includes a secure proof of possession of a secret by a signing device, as performed on provided element of data, known as a "message." A message may include an encrypted mathematical representation of a file or other set of data using the private key 122 of a public key 120 cryptographic system. Secure proof may include any form of secure proof as described above, including without limitation encryption using a private key 122 of a public key 120 cryptographic system as described above. Signature may be verified using a verification datum suitable for verification of a secure proof; for instance, where secure proof is enacted by encrypting message using a private key 122 of a public key 120 cryptographic system, verification may include decrypting the encrypted message using the corresponding public key 120 and comparing the decrypted representation to a purported match that was not encrypted; if the signature protocol is well-designed and implemented correctly, this means the ability to create the digital signature 116 is equivalent to possession of the private decryption key and/or device-specific secret. Likewise, if a message making up a mathematical representation of file is well-designed and implemented correctly, any alteration of the file may result in a mismatch with the digital signature 116; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

As used in this disclosure, a “unique keypair” is a cryptographic set of two mathematically linked keys. In an embodiment, the linked keys may include a private key 122 and a corresponding public key 120. Continuing, the private key 122 may be securely stored and used for signing or decrypting data. Without limitation, the public key 120 may be shared openly for verification or encryption purposes. In an embodiment, the unique keypair 118 may be generated using asymmetric encryption algorithms such as RSA, Elliptic Curve Cryptography (ECC), or Ed25519, enabling secure authentication and data integrity. For example, without limitation, the unique keypair 118 may be used in a cryptocurrency wallet, where the private key 122 allows a user to sign transactions, and the public key 120 generates a blockchain address for receiving funds. In end-to-end encrypted messaging, a user’s public key 120 may be shared with contacts to receive encrypted messages, while the private key 122 decrypts the content. Without limitation, the digital certificate in a public key 120 infrastructure (PKI) may rely on the unique keypair 118, where the private key 122 signs the certificate and the public key 120 verifies its authenticity. In smart contract execution, the unique keypair 118 may authenticate user interactions, ensuring only authorized parties can trigger contract functions. In an embodiment, a hardware security module (HSM) may store private keys securely to facilitate digital signatures without exposing the key itself. Additionally or alternatively, in zero-knowledge proof systems, the unique keypair 118 may enable a user to prove knowledge of a value without revealing the private key 122, enhancing privacy in cryptographic protocols.

With continued reference to FIG. 1, as used in this disclosure, a “representation” is a data construct that uniquely reflects the first event data in a structured form. In an embodiment, the representation may include a hash value, encoded version, or other transformed format of the event data. In an embodiment, the transformed format may ensure integrity and authenticity when digitally signed. the representation may include, for example, without limitation, a cryptographic hash of the first event data, an encrypted version of the first event data, a compressed encoding of the first event data, a Merkle root incorporating the first event data, or a canonicalized format of the first event data that normalizes structural variations while preserving its integrity for verification.

With continued reference to FIG. 1, the representation of the event data may be a cryptographic accumulation of the event data. In an embodiment, the representation of the event data may be a cryptographic accumulation of the event data, wherein the cryptographic accumulation refers to a structured process of aggregating, hashing, and/or encoding multiple pieces of event data to create a verifiable and immutable digital record. The cryptographic accumulation may include, for example, generating a hash chain, wherein each subsequent event data point is incrementally hashed with prior event data to form a linked sequence of cryptographic proofs. Additionally or alternatively, the cryptographic accumulation may involve constructing a Merkle tree, wherein multiple event data entries are hashed together in a hierarchical structure to produce a single Merkle root that serves as a compact, verifiable representation of all accumulated event data. Such cryptographic techniques may enhance the integrity, security, and auditability of the event data, ensuring that any modification to a prior event is detectable and verifiable using the accumulated cryptographic structure. For more detail on cryptographic accumulator please refer to FIG. 2.

Figure 3:
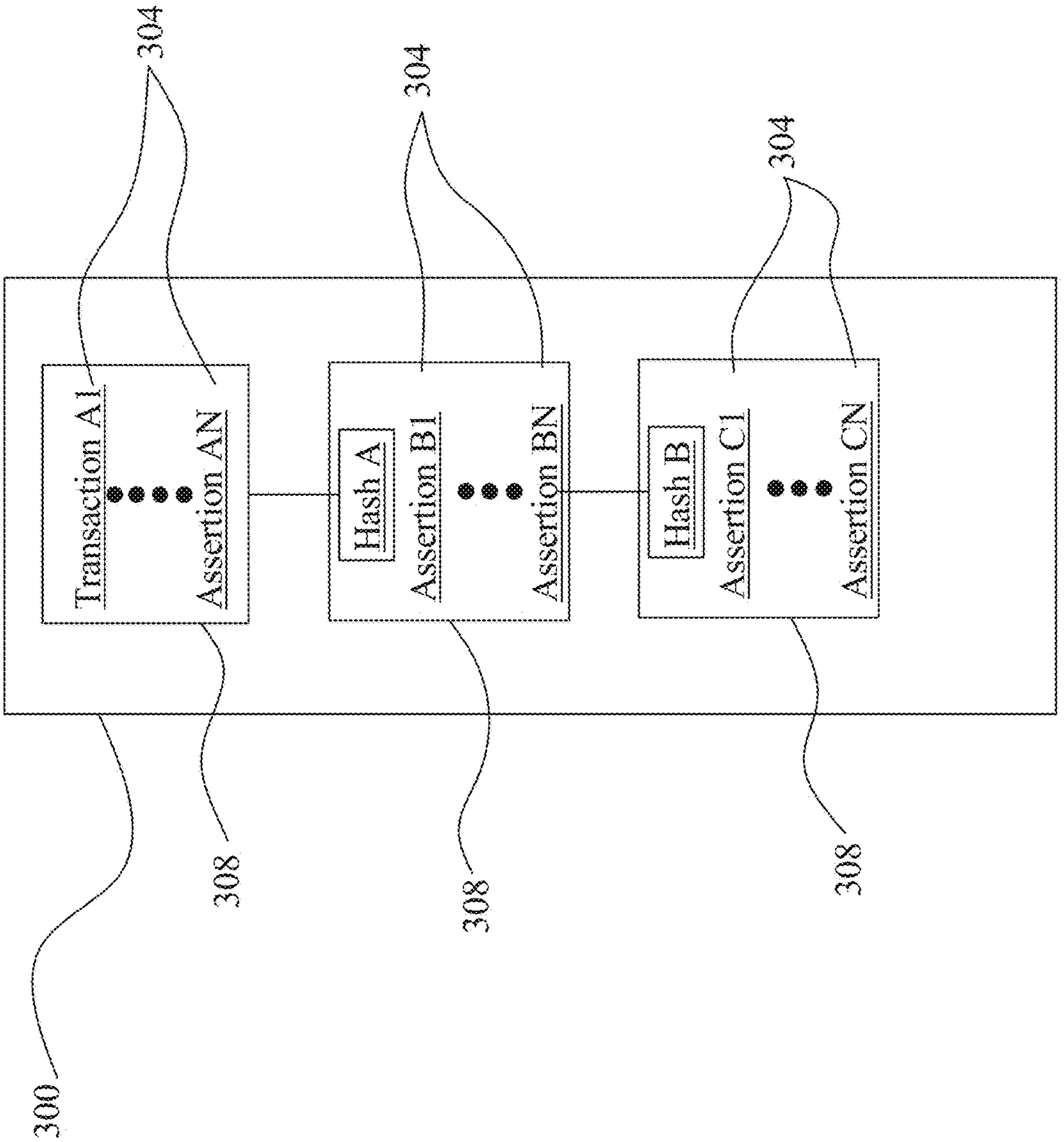
FIG. 3 is an exemplary embodiment of an immutable sequential listing.
Figure 4A:
FIG. 4A-E are exemplary embodiments of a graphical user interface with at least a visual element associated with a digital identity.
Figure 4B:
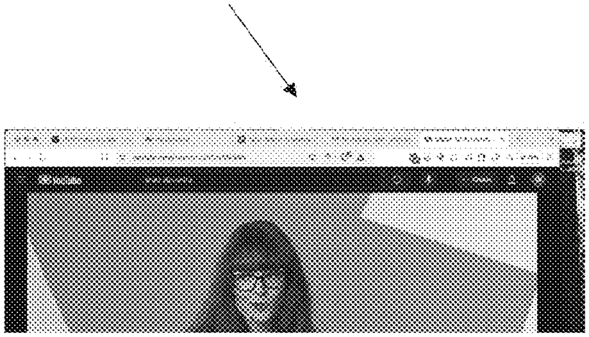
Figure 4C:
Figure 4D:
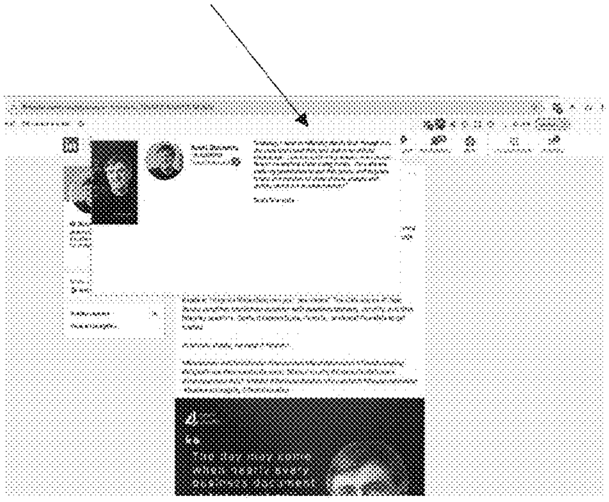
Figure 4E:
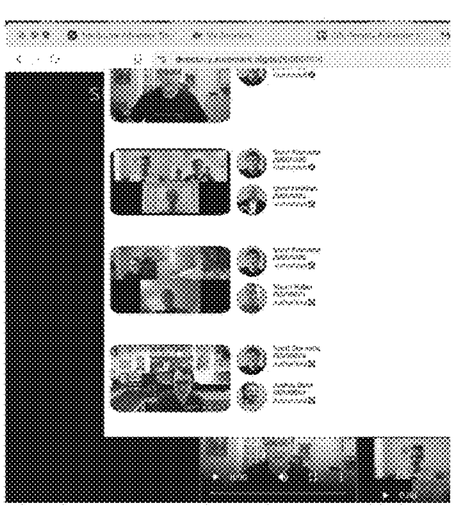

With continued reference to FIG. 1, receiving the first attestation input further may include receiving a posting of the first attestation input on an immutable sequential listing. The first attestation input may include event data and a digital signature, which may be cryptographically associated with a unique digital identity. When this attestation input is received, the system may detect its inclusion in the immutable sequential listing, which may be a blockchain-based ledger, a Merkle tree structure, or another cryptographically verifiable record-keeping system. The detection of the posting may serve as an additional layer of verification, confirming that the attestation was successfully recorded and is available for subsequent authentication or audit processes. FIG. 3 may provide further details on how the immutable sequential listing is structured, updated, and verified, ensuring that each attestation input is securely logged and resistant to modification or deletion.

With continued reference to FIG. 1, the circuitry may be configured to post the event data on the immutable sequential listing. In an embodiment, posting the event data on the immutable sequential listing, may ensure that each event is recorded in a way that preserves its authenticity and historical order. When event data is generated, it may be signed using a cryptographic key associated with a digital identity, producing a digital signature that uniquely links the event data to its origin. The circuitry may then initiate a posting process, which may involve hashing the event data, submitting it to a distributed ledger or database, and ensuring its placement within the sequential structure. This process may include mechanisms to validate and timestamp the event data, preventing retroactive modifications and providing a verifiable proof of authenticity. The immutable sequential listing may act as a publicly accessible or permissioned record, allowing verification entities to cross-check event data postings to authenticate claims and prevent fraudulent representations.

Still referring to FIG. 1, circuitry 102 is configured to identify first attestation metrics associated with the first digital identity. The first attestation metrics may serve as quantifiable or verifiable indicators that contribute to assessing the credibility, authenticity, or trustworthiness of the first digital identity. The circuitry may retrieve the first attestation metrics from previous attestations, endorsements, verification records, or cryptographic proofs stored in an immutable sequential listing or a distributed ledger. The first attestation metrics may include, for example, the number of prior attestations linked to the first digital identity, the reputation scores of endorsing entities, the frequency and consistency of event data submissions, cryptographic signatures verifying identity ownership, and historical validation results from decentralized authentication nodes. The circuitry may analyze the first attestation metrics to establish a reputation score, validation confidence level, and/or trust indicators, as described herein, which may be used in subsequent authentication processes. In some embodiments, the identification of attestation metrics may involve a recursive evaluation, where the credibility of prior attestations is assessed based on the reputation and trust levels of the entities that provided endorsements. This approach may help mitigate fraudulent claims and reinforce the integrity of the attestation process by ensuring that only highly authenticated digital identities contribute to verification decisions.

Still referring to FIG. 1, the circuitry 102 is configured to receive at least a second attestation input associated with at least a second digital identity of the plurality of digital identities, wherein the second attestation input comprises a second digital signature signing the first attestation input and the second digital signature is signed using a second unique keypair distinct from the first unique keypair. At least a second attestation input may include a plurality of attestation inputs in some embodiments. This second digital identity may function independently from the first digital identity but may contribute to the overall attestation process by providing additional validation or endorsement through the second digital signature; apparatus may interpret existence of a signature alone as affirmation of a connection between first identifier and event data, or alternatively may evaluate a statement and/or numerical score, which may be included in and/or linked to at least a second digital signature, indicating a degree of agreement and/or disagreement with that connection. Second attestation input may include a second digital signature, which signs the first attestation input. This means that second digital identity may be cryptographically endorsing, verifying, or acknowledging the event data associated with the first digital identity. Second digital signature may be generated using a second unique keypair, which is entirely distinct from the first unique keypair, ensuring that the attestation is coming from an independent source rather than the same entity. In an embodiment, this distinction between first and second digital identities may be used to establish multi-party validation. Second digital identity may act as an observer, verifier, or cross-signer, helping to enhance the credibility of the first attestation input by adding additional layers of cryptographic proof. Without limitation, since each digital identity operates with its own unique keypair, the system may prevent self-signing fraud, where a single entity attempts to fabricate multiple endorsements using the same cryptographic credentials. Reception of this second attestation input may enable a decentralized reputation model, where multiple digital identities can validate the same event data, increasing its trustworthiness and resistance to manipulation. Without limitation, by ensuring that each attestation input is cryptographically signed using the plurality of unique keypairs assigned to specifically to each of the plurality of digital identities, the system may establish a transparent and verifiable chain of endorsements, enhancing authentication integrity across multiple independent identities.

Still referring to FIG. 1, apparatus 100 is configured to authenticate first identity as a function of the first digital signature, the second digital signature, the first attestation metrics, and the second attestation metrics. Authentication may be performed, without limitation by computing an authentication score for the first identity using the first attestation entry and the at least a second attestation entry. Authentication may be performed by adding up or otherwise aggregating endorsing signatures of the at least a second attestation input, potentially while subtracting counter-endorsements or negative endorsements. In some embodiments, this may include a weighted sum: each identity of the at least a second identity may have a score or other number representing a cumulative score computed as described in further detail below, which may be used as a weight in a weighted sum of endorsements of the first signature of the event data. A weighted sum relating to the first attestation input may be added to weighted sums relating to other attestation inputs signed with first key pair to generate an overall score for first digital identity, creating a cumulative score. Where an immutable sequential listing is used to record signatures, participating nodes may post calculated cumulative scores for a given digital identity, which may be verified and/or validated by additional nodes that recalculate the score; in some embodiments, apparatus add scores associated with later-generated attestation inputs to update the score, which may in turn be posted by apparatus to the immutable sequential listing.

Further referring to FIG. 1, a score for first attestation input and/or a cumulative score may be compared to a preconfigured threshold, creating a pass/fail result—this may, for instance, block access for a web browser or native application attempting to gain access to content purveyed by first identity, such as a website or the like associated therewith, which block may be optionally overridden by user input for instance and without limitation using a "continue anyway" button or similar feature in a user interface. An exemplary user interface is described below. Alternatively or additionally, any score and/or any endorsing identities and/or the contents or quantities of endorsement messages may be displayed at a user interface. A descriptor or level associated with the score may alternatively or additionally be displayed, for instance and without limitation by comparing the score to multiple preconfigured thresholds above which a score may be designated as highly authenticated, moderately authenticated, weakly authenticated, or not authenticated/not trusted.

With continued reference to FIG. 1, authenticating the first identity further may include recursively authenticating the at least a second digital identity by authenticating at least a third attestation input signing the second attestation data and authenticating the at least a second digital identity using at least a third attestation input. This may include computing and/or retrieving cumulative scores for each of the at least a second identity or other attesting identity, which may in turn have been computed using any process for computing an event-related or cumulative score for first identity, including recursively. Recursion may alternatively or additionally be accomplished by using stored and/or posted cumulative scores for at least a second identity that may have been calculated and posted to an immutable sequential listing or other location in the past. Without limitation, the recursive approach may ensure that each digital identity in the system is not only authenticated based on its own attestation input but also through the verification of other digital identities endorsing it. Specifically, the second digital identity may be authenticated by validating at least a third attestation input, which itself signs the second attestation data. Continuing, this may create a multi-layered authentication process where the digital identities are verified not in isolation but through a chain of cryptographic endorsements or digital signatures. Without limitation, the third attestation input may function as an independent validation record that signs the second attestation input, providing an additional layer of verification. The recursive attestation process may help mitigate fraudulent claims by ensuring that a digital identity cannot simply fabricate its own authentication without external validation. A distributed trusted model may be established by requiring a chain of endorsements, where each digital identity is authenticated through attestations from other verified entities. Continuing, this approach may significantly reduce the risk of identity spoofing or self-referential fraud, as each layer of authentication is dependent on verifiable cryptographic signatures from independent digital identities. The circuitry 102 may be configured to authenticate the second digital identity using the third attestation input, ensuring that the second digital identity itself has been endorsed by another entity before being used in the authentication of the first digital identity. This means that before a digital identity can provide validation for another entity, it must have its own attestation lineage validated. The recursive verification may allow for a hierarchical or decentralized reputation-based authentication system, where the credibility of each digital identity is derived from a network of verified attestations rather than a single-point verification model. In an embodiment, through this recursive authentication framework, the system may establish a robust, tamper-resistant method of validating digital identities, reducing reliance on centralized trust authorities while leveraging a distributed network of endorsements.

With continued reference to FIG. 1, the circuitry 102 may be configured to sign the first attestation input using a third unique keypair associated with the circuitry. Without limitation, the third unique keypair, consisting of a distinct public and private key, may serve as an additional endorsement separate from the first digital identity and the second digital identity, reinforcing the authenticity and integrity of the attestation process. Continuing, by applying its own digital signature, the circuitry may act as an authoritative validator, confirming that the first attestation input has been properly received, processed, and recorded within the authentication framework. This signature may then be stored in an immutable sequential listing, such as a blockchain ledger or cryptographically secured database, allowing for future verification while preventing unauthorized modifications. In some embodiments, the circuitry's signature may function as part of a consensus mechanism, verifying that the attestation input aligns with predefined authentication criteria before it is formally accepted within the verification network, which may include validating the cryptographic integrity of the attestation, confirming its association with the first digital identity, and ensuring consistency with prior attestations. Once signed by the third unique keypair, the attestation input may be distributed across a network of verification nodes, enabling decentralized validation while preventing single-point manipulation or self-authentication fraud. Continuing, leveraging a unique system-level keypair distinct from the individual digital identities, the authentication process may become more resilient to tampering, as attestations are not solely dependent on direct self-signing but are instead reinforced through independent system-level validation, increasing the reliability and security of digital identity verification within a cryptographically protected framework.

Still referring to FIG. 1, the circuitry 102 is configured to identify second attestation metrics associated with the at least a second digital identity. The second attestation metrics may serve as measurable indicators used to evaluate the credibility, trustworthiness, and authentication history of the second digital identity. The second attestation metrics may be derived from various factors, including but not limited to the number of prior attestations associated with the second digital identity, the strength and consistency of cryptographic signatures linked to previous attestations, the reputation and validation history of endorsing entities, and the frequency of the second digital identity's participation in authenticated transactions. The circuitry may retrieve the second attestation metrics from an immutable sequential listing, a distributed ledger, or a decentralized authentication framework, ensuring that the attestation metrics are verifiable and tamper-resistant. In some embodiments, the second attestation metrics may be analyzed in relation to the first attestation metrics, providing a comparative trust assessment that considers whether the second digital identity has been endorsed by previously validated digital identities or if it has exhibited patterns consistent with fraudulent activity. Additionally and or alternatively, the system may perform a recursive reputation evaluation, wherein the credibility of the second digital identity is weighted based on the reliability of the entities that have endorsed it, preventing low-reputation identities from unduly influencing the authentication process.

Still referring to FIG. 1, the circuitry 102 is configured to authenticating, using the plurality of digital identities, the first digital identity as a function of the first digital signature, the second digital signature, the first attestation metrics, and the second attestation metrics. The authentication process may involve a multi-layered validation framework that leverages cryptographic attestations, historical trust data, and endorsements from multiple independent digital identities to verify the authenticity and legitimacy of the first digital identity. The circuitry may first retrieve and validate the first digital signature, which may have been generated using the private key of the first digital identity to sign an attestation input, ensuring that the data originated from the claimed identity and has not been altered. Similarly, the second digital signature may be analyzed, wherein the second digital identity provides an independent cryptographic endorsement of the first attestation input, further reinforcing the integrity of the authentication process. Beyond verifying these cryptographic signatures, the circuitry may also factor in first attestation metrics, which may include parameters such as the number of prior attestations associated with the first digital identity, the credibility of the endorsing entities, the consistency of historical attestations, and the extent to which the identity has participated in authenticated transactions. Continuing, this information may be cross-referenced against second attestation metrics, which pertain to the second digital identity that provided the supporting digital signature, allowing the system to evaluate whether the second digital identity itself has a strong authentication history and is not associated with fraudulent behavior. The circuitry may employ a reputation-weighted authentication model, wherein endorsements from high-reputation digital identities contribute more heavily to the verification process than those from lower-reputation entities, ensuring that authentication is resistant to manipulation by unverified or malicious actors. In some embodiments, the authentication process may include a recursive verification mechanism, where the reputation of each digital identity participating in the authentication process is further validated based on its prior endorsements. This recursive approach may prevent situations where multiple low-reputation digital identities attempt to falsely authenticate one another. Additionally and or alternatively, the circuitry may incorporate a consensus-based validation model, wherein multiple independent digital identities collectively contribute to the authentication decision, ensuring that no single entity can unilaterally authenticate the first digital identity without corroborating attestations.

With continued reference to FIG. 1, the circuitry 102 may be configured to display, using a graphical user interface, an authentication result, which may be any authentication result, score, list of endorsements, access denial, categorization of scores, or the like as described above, wherein the authentication result comprises at least a visual element, wherein the at least a visual element indicates a verification status of the first digital identity. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device may include a data structure. With continued reference to FIG. 1, as used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor, wherein elements within graphical user interface may be modified as a result. In some cases, processor may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor may transmit the data described above to a database wherein the data may be accessed from the database. Processor may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, a "verification status" is an indication of the authentication outcome associated with a digital identity, attestation input, or event data. In an embodiment, the verification status may be determined based on one or more cryptographic signatures, attestation metrics, endorsements from other digital identities, or validation criteria applied by the circuitry. The verification status may include, for example, a confirmed status, indicating that the digital identity or attestation has been successfully authenticated based on predefined trust parameters; a pending status, indicating that additional attestations or endorsements are required before authentication is complete; a flagged status, indicating inconsistencies, anomalies, or potential fraudulent activity detected in the attestation process; or an unverified status, indicating the absence of sufficient authentication data or failure to meet verification thresholds. The verification status may be dynamically updated based on changes in attestation inputs, additional endorsements, or modifications detected in the immutable sequential listing, and may be displayed through a graphical user interface, recorded within a decentralized ledger, or utilized as a decision parameter within an authentication framework.

With continued reference to FIG. 1, For example, a confirmed verification status may be displayed as a green checkmark next to the authenticated identity or event data, accompanied by a label such as "Verified" or "Authenticated", signaling that the attestation has been successfully validated. A pending verification status may appear as a yellow hourglass, spinning loader, or hourglass icon, with a label such as "Pending Verification", indicating that additional attestations or endorsements are required before authentication is complete. A flagged verification status may be shown as a red warning triangle, or a question mark ("?"), accompanied by a label such as "Flagged for Review", signifying that inconsistencies, anomalies, or potential fraud have been detected in the attestation process. An unverified status may be represented by a gray "X" or a faded-out icon, with a label such as "Not Verified", indicating that the attestation lacks sufficient authentication data or has failed to meet verification thresholds. The visual elements may be integrated into user dashboards, transaction logs, authentication reports, or blockchain explorers, ensuring that verification status is accessible and transparent. Additionally and or alternatively, when a user hovers over or clicks on the verification status, a detailed pop-up or expandable section may appear, displaying metadata such as the cryptographic signatures involved, attestation history, endorsement sources, timestamp of last verification, and any warnings or discrepancies detected. This design allows for both quick-glance authentication and in-depth validation analysis, providing a seamless and user-friendly method for assessing trust and authenticity within the system.

With continued reference to FIG. 1, authenticating the first digital identity may include transmitting, using the circuitry 102, the first attestation metrics of the first digital identity to at least an evaluation node, wherein each evaluation node of the at least an evaluation node comprises a unique node keypair, the unique node keypair comprising a private node key and a public node key, receiving, from each of the at least an evaluation node, a node signature signed using a corresponding private node key, and authenticating the first digital identity based on the node signature. As used in this disclosure, "evaluation nodes" are computational entities within a distributed system that assess unique identities 110 to determine authenticity based on predefined criteria. Evaluation nodes 164 may operate independently or collaboratively within a network to process information, apply verification rules, and contribute to consensus mechanisms. In an embodiment, evaluation nodes 164 may be utilized in a decentralized reputation model 156 to assess the credibility of unique identities 110 by analyzing historical event data 158, cryptographic attestations, or interactions with connected digital identities 138. For example, without limitation, in a blockchain-based identity verification system, the evaluation nodes 164 may verify transactions, validate signatures, and record trust scores on the public ledger 124. Additionally and or alternatively, the evaluation nodes 164 may dynamically adjust reputation models by incorporating new attestations 160 or revocations 162, ensuring real-time updates to identity trustworthiness. Without limitation, the evaluation nodes 164 may distribute evaluation responsibilities across multiple nodes and provide the system with enhanced reliability, security, and resistance to manipulation.

With continued reference to FIG. 1, as used in this disclosure, "evaluation parameters" are predefined criteria used by the evaluation nodes 164 to assess authenticity of a unique identity. Evaluation parameters 166 may include quantitative thresholds, qualitative conditions, or algorithmic factors that guide decision-making within the evaluation framework used by the evaluation nodes 164. In an embodiment, the evaluation parameters 166 may be used in the decentralized reputation model 156 to determine the trustworthiness of a digital identity 132 based on historical event data 158, verification attestations, and revocation records. For example, without limitation, the evaluation parameters 166 may include the frequency of successful identity verifications, the number of trusted endorsements received, or the severity of past security breaches. Additionally and or alternatively, the evaluation parameters 166 may be dynamically adjusted based on evolving system conditions, such as changes in network policies, security threats, or user behavior patterns. Without limitation, by establishing the evaluation parameters 166, the apparatus 100 ensures consistent, objective, and adaptive assessments across various verification and trust models.

Still referring to FIG. 1, circuitry 102 is configured to receive attestation input 106 associated with a first unique identity 108 of a plurality of unique identities 110, wherein the attestation input 106 comprises event data 112. As used in this disclosure, a "unique identity" is an account that has been registered within a system but has not yet been validated. Without limitation, unique identity may be a distinct identity associated with an entity within a given identifier set, such as a GUID, UUID, or similar identifier. Unique identity may be pseudonymous, meaning it does not necessarily reveal the real-world identity of the entity it represents but remains uniquely distinguishable within the system, for instance, it may be, or be based on or linked to, a validation datum such as a public key in a public key cryptographic system. In some embodiments, the unique identity may refer to an account that has been registered but has not yet undergone validation, allowing it to exist within the system while remaining subject to further authentication or attestation processes. A unique identity may be created when a user submits registration information, such as an email address, username, and/or phone number, without completing a required verification process. For example, without limitation, the system may generate the unique identity when a user signs up for an account but has not yet confirmed their email through a verification link. Similarly, the unique identity may be generated when a blockchain wallet address is created but remains unverified due to the absence of an initial transaction or authentication step. In another example, a social media platform may assign a unique identity to a newly registered account that has not yet been verified through multi-factor authentication. A cloud-based service may also generate a unique identity when a user initiates a free trial but has not completed identity verification or payment confirmation. Additionally and/or alternatively, the unique identity may include an enterprise account that has been created for an employee but remains inactive until linked to company credentials.

With continued reference to FIG. 1, in a non-limiting example, the attestation input 106 may capture interactions within an online platform, such as submitting a form, posting content, or updating account settings. Circuitry 102 may receive attestation input 106 in the form of real-time activity, such as initiating a secure data transfer, approving a multi-factor authentication request, or executing a smart contract function. Without limitation, by processing the attestation input 106, the apparatus 100 may facilitate accurate tracking, authentication, and management of interactions associated with each unique identity of the plurality of unique identities 110. Continuing, event data 112 may include the underlying metadata, cryptographic proofs, or records generated as a result of these actions. For example, if a user posts content, the associated event data 112 may include a timestamp, user identifier, digital signature, and hash of the posted content. If a user updates account settings, the event data 112 may consist of a record of the previous and new settings, the method of authentication, and any validation checks performed.

With continued reference to FIG. 1, the at least a circuitry 102 may be configured to inscribe the event data 112 on an immutable sequential listing. In an embodiment, without limitation, the immutable sequence listing may include a cryptocurrency blockchain 114. In an embodiment, the event data 112 may include at least a digital signature 116 associated with the first unique identity 108. In an embodiment, a digitally signed entry on the blockchain may refer to recording event data 112 on the blockchain with at least a digital signature 116, where the at least a digital signature 116 may be embedded within the event data 112 and/or used to sign the event data 112 using the corresponding key pair. As used in this disclosure, a "cryptocurrency blockchain" is a decentralized, distributed ledger that records and verifies transactions involving digital assets using cryptographic techniques. The cryptocurrency blockchain 114 may be composed of a series of linked blocks, each containing a set of transactions that are validated through consensus mechanisms such as proof of work (PoW) or proof of stake (POS). The cryptocurrency blockchain 114 may facilitate secure, transparent, and immutable transaction records without the need for a central authority. In some cases, the cryptocurrency blockchain 114 may support smart contracts, enabling automated execution of agreements based on predefined conditions. For example, without limitation, the cryptocurrency blockchain 114 may include Bitcoin, Ethereum, and other blockchain networks designed to facilitate peer-to-peer transactions, token transfers, or decentralized applications. The cryptocurrency blockchain 114 may include the Bitcoin blockchain, which may record peer-to-peer transactions of Bitcoin, ensuring that each transaction is verified by a decentralized network of miners using proof of work. The Ethereum blockchain may support smart contract execution, enabling users to create decentralized applications (dApps) and facilitate transactions involving tokens such as Ether (ETH) or ERC-20 assets. On the Solana blockchain, high-speed and low-cost transactions may allow for efficient decentralized finance (DeFi) operations, including automated lending and staking. A private blockchain network, such as Hyperledger Fabric, may be used by enterprises to securely track supply chain transactions while restricting access to authorized participants. Additionally and or alternatively, a layer-2 blockchain solution like the Lightning Network may process Bitcoin transactions off-chain, reducing congestion and increasing transaction speed while maintaining final settlement on the Bitcoin blockchain.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), hashes functions used for Message Authentication Code ("MAC") implementations such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of O ($2^{n/2}$) for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, the at least a circuitry 102 may be further configured to receive an identity challenge request from a verifying entity 172, authenticate the first unique identity 108 by generating a zero-knowledge proof 174 derived from the attestation metrics 134, and transmit the zero-knowledge proof 174 to the verifying entity 172 for validation. As used in this disclosure, an "identity challenge request" is a security mechanism that prompts an entity to provide one or more verification factors to confirm its identity before granting access for a transaction. The identity challenge request may be triggered based on predefined security conditions, such as detecting anomalous behavior, accessing sensitive resources, or initiating high-risk transactions. In an embodiment, the identity challenge request may require the entity to respond with biometric authentication 152, cryptographic key validation 154, or a multi-factor authentication code to verify legitimacy. For example, without limitation, when a unique identity attempts to access a decentralized identity network from a new device, the apparatus 100 may issue an identity challenge request requiring confirmation via a one-time password and facial recognition. Additionally and or alternatively, in a blockchain-based reputation system, the identity challenge request may be issued when the score 168 of the unique identity falls below a certain threshold, requiring additional attestations from verified sources before allowing further interactions. Without limitation, by implementing the identity challenge request, the apparatus 100 enhances security, prevents unauthorized access, and ensures the integrity of identity verification processes.

Further referring to FIG. 1, apparatus may transmit a challenge to a device associated with the first digital identity, and the first attestation entry may include a challenge response; challenge response may take any form of attestation entry and/or challenge response as described in this disclosure. For instance, and without limitation, event data may include and/or be included in challenge; first attestation may sign event data from challenge and/or challenge, or may sign other event data and/or add other event data to be signed in challenge response. For instance, challenge may include a string of characters, a hash of some data collection, or the like; challenge response may sign such a collection and/or a combination thereof with event data. In some embodiments, transmission of challenge and reception of challenge response may occur at or around a beginning of a communication session such as a chat, a voice over Internet protocol call, a telephone call, or the like. Authentication display may indicate that the first digital identity identifies a persons claimed to possess it by virtue of association with various event data.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof 174, which may provide an output demonstrating possession of a secret while revealing none of the secret to a recipient of the output; zero-knowledge proof 174 may be information-theoretically secure, meaning that an entity with infinite computing power would be unable to determine secret from output. Alternatively, zero-knowledge proof 174 may be computationally secure, meaning that determination of secret from output is computationally infeasible, for instance to the same extent that determination of a private key from a public key 120 in a public key 120 cryptographic system is computationally infeasible. Zero-knowledge proof 174 algorithms may generally include a set of two algorithms, a prover algorithm, or "P," which is used to prove computational integrity and/or possession of a secret, and a verifier algorithm, or "V" whereby a party may check the validity of P. Zero-knowledge proof 174 may include an interactive zero-knowledge proof 174, wherein a party verifying the proof must directly interact with the proving party; for instance, the verifying and proving parties may be required to be online, or connected to the same network as each other, at the same time. Interactive zero-knowledge proof 174 may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof 174 may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof 174 may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof 174 may include a Succinct Transparent Arguments of Knowledge (ZK-STARKS) zero-knowledge proof 174. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof 174 may include any other suitable zero-knowledge proof 174. Zero-knowledge proof 174 may include, without limitation bulletproofs. Zero-knowledge proof 174 may include a homomorphic public-key cryptography (hPKC)-based proof. Zero-knowledge proof 174 may include a discrete logarithmic problem (DLP) proof. Zero-knowledge proof 174 may include a secure multi-party computation (MPC) proof. Zero-knowledge proof 174 may include, without limitation, an incrementally verifiable computation (IVC). Zero-knowledge proof 174 may include an interactive oracle proof (IOP). Zero-knowledge proof 174 may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Without limitation, the session-specific secret may serve as a cryptographic identifier that ensures the integrity, authenticity, and verifiability of the attestation input. In one embodiment, the session-specific secret may be used to sign event data 112 or be incorporated within a cryptographic accumulator to enable efficient proof generation. The plurality of open nodes 130 may utilize the session-specific secret to generate digital signatures, commit event data 112 to the public ledger 124, or provide zero-knowledge proofs (ZKPs) that confirm an entity's participation in an event without revealing sensitive details. The secret may also be used to bind attestations to specific timeframes or identity-linked cryptographic keys, further strengthening the trust model of the system. Session-specific secret may be converted to and/or added to a secure proof, verification datum 148, and/or key according to any process as described above for generation of a secure proof, verification datum 148, and/or key from a secret or "seed"; session-specific secret, a key produced therewith, verification datum 148 produced therewith, and/or a secure proof produced therewith may be combined with module-specific secret, a key produced therewith, a verification datum 148 produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key 120 in a public key 120 cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature 116.

With continued reference to FIG. 1, in some embodiments, a third party such as a certificate authority (CA) is available to verify that the possessor of the private key 122 is a particular entity; thus, if the certificate authority may be trusted, and the private key 122 has not been stolen, the ability of an entity to produce a digital signature 116 confirms the identity of the entity and links the file to the entity in a verifiable way. Digital signature 116 may be incorporated in a digital certificate, which is a document authenticating the entity possessing the private key 122 by authority of the issuing certificate authority and signed with a digital signature 116 created with that private key 122 and a mathematical representation of the remainder of the certificate. In other embodiments, digital signature 116 is verified by comparing the digital signature 116 to one known to have been created by the entity that purportedly signed the digital signature 116; for instance, if the public key 120 that decrypts the known signature also decrypts the digital signature 116, the digital signature 116 may be considered verified. Digital signature 116 may also be used to verify that the file has not been altered since the formation of the digital signature 116.

With continued reference to FIG. 1, in a non-limiting example, the event data 112 may include the digital signature 116 uniquely linked to the identity of a user, allowing for authentication and non-repudiation of recorded transactions. For example, without limitation, the circuitry 102 may inscribe a cryptographic hash of a signed document onto the blockchain, creating an immutable proof of its existence at a specific time. In another non-limiting example, the circuitry 102 may record a digitally signed smart contract execution, associating the transaction with the user's unique identity to enable automated verification and auditability.

Still referring to FIG. 1, circuitry 102 is configured to assign a unique keypair 118 to the first unique identity 108, wherein unique keypair 118 comprises a public key 120 and a private key 122, wherein the public key 120 is stored on a public ledger 124.

With continued reference to FIG. 1, as used in this disclosure, a "public ledger," which also may be referred to as a "public log," is a decentralized and openly accessible digital record that chronologically documents data entries in a transparent and immutable manner; a public log may be amenable to consensus-based evaluation and/or authentication. Without limitation, the public ledger 124 may be maintained by a distributed network of nodes that validate and synchronize data entries using consensus mechanisms, ensuring security and preventing unauthorized modifications. In an embodiment, the public ledger 124 may include the Bitcoin blockchain, which records all Bitcoin transactions, allowing anyone to verify balances and transaction history without requiring a central authority. The Ethereum blockchain may function as a public ledger 124 that not only records Ether transactions but also logs the execution of smart contracts, enabling decentralized applications to operate transparently. In the Filecoin network, the public ledger 124 may store cryptographic proofs of decentralized file storage, ensuring that data remains retrievable and verifiable over time. The Polkadot blockchain may act as a public ledger 124 that facilitates interoperability by recording cross-chain transactions between different blockchain networks. A government-backed public ledger 124 may be used to track land ownership, ensuring that property records remain publicly accessible and resistant to fraud. Additionally and or alternatively, a supply chain transparency ledger may document the movement of goods, allowing consumers to verify the origin and authenticity of products through an open blockchain record.

With continued reference to FIG. 1, the unique keypair 118 may include a public key 120 and a private key 122, where the public key 120 may be accessible on or to users of a public ledger 124 to facilitate verification. For example, without limitation, the public key 120 may be inscribed on a blockchain network, allowing other entities to validate digital signatures or encrypted messages associated with the unique identity. In contrast, the private key 122 may remain securely stored and controlled by the user, ensuring that only the rightful owner can authorize transactions or decrypt sensitive data.

With continued reference to FIG. 1, the at least a circuitry 102 may be further configured to generate, using cryptographic techniques, an immutable proof of attestation by hashing the event data 112, store, using the public ledger 124, hashed event data 126, and verify, using the public ledger 124, the event data 112 upon request from a third-party entity 128. As used in this disclosure, "cryptographic techniques" are mathematical methods and algorithms used to secure data, authenticate identities, and ensure the integrity of digital transactions. Cryptographic techniques may include encryption algorithms, hashing functions, digital signatures, and key exchange protocols that protect information from unauthorized access or tampering. Examples of cryptographic techniques may include asymmetric encryption, such as RSA or elliptic curve cryptography (ECC), which utilizes public and private key pairs for secure communication. Symmetric encryption methods, such as the Advanced Encryption Standard (AES), may be used to encrypt and decrypt data using a shared secret key. Hashing functions, such as SHA-256, may generate fixed-length representations of data for integrity verification and blockchain security. Digital signatures, such as those based on the Elliptic Curve Digital Signature Algorithm (ECDSA), may authenticate the origin and validity of messages or transactions in a decentralized system.

With continued reference to FIG. 1, the attestation of the event data 112 may incorporate zero-knowledge proofs (ZKPs), such as ZK-STARKs, to provide cryptographic verification without revealing the underlying data. This aligns with the use of cryptographic accumulator, where event data 112 can be structured, for example in a Merkle tree branch generated through an accumulation of the event data 112. Continuing, the immutable proof of attestation may be generated by hashing the event data 112 and subsequently storing the hashed event data 126 on the public ledger 124. In a non-limiting example, upon request from the third-party entity 128, verification of the event data 112 may be performed using the public ledger 124, leveraging cryptographic techniques, including ZK proofs, to ensure integrity and confidentiality.

With continued reference to FIG. 1, as used in this disclosure, an "immutable proof" is a verifiable data structure that, once created, cannot be modified or deleted, at least without detection by public users. In an embodiment, the immutable proof may ensure the integrity and authenticity of the recorded information, such as the event data 112. The immutable proof may be generated using cryptographic techniques, such as hashing, digital signatures, or blockchain technology, to establish a tamper-resistant record of the event data 112. For example, a cryptographic hash of a document may be recorded on a blockchain, creating an immutable proof of its existence at a specific time. In another non-limiting example, a digitally signed transaction may be inscribed onto a distributed ledger, ensuring that the transaction details remain permanently verifiable. Immutable proofs may be used to verify digital agreements, authenticate records, secure audit trails, and prevent data forgery.

With continued reference to FIG. 1, as used in this disclosure, "hash event data" is a cryptographic representation of event data 112 generated using a hashing function to create a fixed-length output that uniquely corresponds to the original data. Hash event data 126 may serve as a tamper-resistant record that ensures data integrity without exposing the underlying information. For example, a cryptographic hash of a transaction record may be stored on a blockchain, allowing future verification that the original transaction remains unaltered. In another example, hash event data 126 may be used to authenticate digital documents by comparing newly generated hash values with previously recorded ones. Hash event data 126 may be utilized in applications such as audit trails, timestamping services, and decentralized verification systems.

With continued reference to FIG. 1, in addition to simple hashing, cryptographic accumulators may be employed to provide efficient and verifiable membership proofs for event data, as discussed in more detail in FIG. 2 below. The cryptographic accumulator may allow multiple pieces of event data 112 to be aggregated into a single succinct cryptographic commitment while enabling proof generation for individual data elements without revealing the entire dataset. For instance, without limitation, event data 112 may be structured using a Merkle tree or another accumulator-based approach, where Merkle tree branches derived from accumulated event data can be used in ZK proofs for privacy-preserving verification.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key 120 cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, as used in this disclosure, a "third-party entity" is an external organization, individual, or system that interacts with, verifies, or facilitates processes between two or more primary parties without being directly controlled by them. A third-party entity 128 may provide services such as authentication, validation, escrow, or compliance monitoring. For example, a trusted certification authority may act as a third-party entity 128 by issuing digital certificates for secure communications. In another example, a blockchain oracle may serve as a third-party entity 128 by supplying external data to smart contracts for automated decision-making. Third-party entities may also include auditors, regulatory agencies, payment processors, or identity verification providers that ensure trust and compliance in digital transactions Still referring to FIG. 1, circuitry 102 is configured to authenticate, using a plurality of open nodes 130, the first unique identity 108 as a function of the event data 112 and the public key 120, wherein authenticating further comprises authenticating using attestation metrics 134 and the attestation metrics 134 are derived from the event data 112.

With continued reference to FIG. 1, the at least a circuitry 102 may be further configured to receive a compromised alert 136, revoke, as a function of the compromised alert 136 and a plurality of connected digital identities 138 of the plurality of open nodes 130, the private key 122 from a second unique identity 140, wherein the plurality of connected digital identities 138 comprise a relationship 142 with the first unique identity 108 over a temporal range 144, generate a replacement private key 146 for the first unique identity 108, and assign the replacement private key 146 to the first unique identity 108. As used in this disclosure, a "compromised alert" is a signal indicating that an identity has been breached or is at risk due to unauthorized access, malicious activities, or other security threats. Without limitation, the compromised alert 136 may serve to inform system administrators, security teams, or the affected users about the potential or confirmed compromise. In an embodiment, the compromised alert 136 may prompt immediate action to assess, contain, and remediate the situation. Without limitation, the compromised alert 136 may stem from various detection mechanisms like intrusion detection systems, anomaly detection algorithms, or manual reports from plurality of open nodes 130, highlighting issues like data leaks, malware infections, unauthorized access attempts, or deviations from normal operational behavior. In an embodiment, the compromised alert 136 may be critical for maintaining security, ensuring quick response to threats, and minimizing potential damage or data loss for the plurality of unique identities 110 and or the digital identities.

With continued reference to FIG. 1, as used in this disclosure, "connected digital identities" are other verified users whose digital representations have undergone a formal process of authentication and are linked with the first unique identity 108. Without limitation, the plurality of connected digital identities 138 may be recognized by the apparatus 100 as legitimate and trustworthy. Continuing, the plurality of connected digital identities 138 may be established through various means such as those described for establishing the digital identity 132 herein, including without limitation, mutual authentication protocols, shared digital certificates, or user consent, facilitating a secure and verified network where each identity can interact with others with confidence in their authenticity. Additionally and or alternatively, cryptographic techniques may be employed to maintain the integrity of these relationships 142, allowing connected digital identities 138 to sign each other's attestations or provide endorsements that strengthen the overall trust framework.

With continued reference to FIG. 1, as used in this disclosure, a "relationship" is an association, connection, or interaction between two or more entities. In an embodiment, the first unique identity 108 may include one or more relationship 142 with another unique identity, another digital identity 132, and the like. For example, without limitation, the relationship 142 may include a social connection between two unique identities 110 on a networking platform, such as a friend request, follower, or mutual connection. In another non-limiting example, the relationship 142 may include a business relationship 142 such as a contractual relationship 142 between a vendor identity and a client identity on a digital platform. In another embodiment, the relationship 142 may include a familial relationship 142 between a parent digital identity and a child digital identity, and the like. In an embodiment, additional factors may contribute to defining or verifying the relationship 142 between two identities. For example, without limitation, patterns of communication between the plurality of open nodes 130 associated with the identities, co-occurrence in events, and historical attestations of their interactions may serve as indicators of an established connection. For instance, frequent and authenticated data exchanges between two identities may reinforce their relationship status, while prior attestations linking the entities may strengthen their association within the system.

With continued reference to FIG. 1, as used in this disclosure, a "temporal range" is a defined span of time between a start time and an end time, during which a particular event is measured. The temporal range 144 may be expressed in various units, such as seconds, minutes, hours, days, or any other suitable time intervals, and may be dynamically or statically determined based on system parameters. In an embodiment, the temporal range 144 may be utilized to establish the validity of cryptographic credentials, restrict access to digital resources, define scheduling constraints, or analyze time-based data trends. The temporal range 144 may be adjusted based on contextual factors, such as user preferences, system policies, or real-time conditions. In an embodiment, the temporal range 144 may be leveraged to define scheduling constraints, such as setting start and end times for automated processes, transaction windows, or system events that must occur within a designated time-frame. Continuing, temporal ranges 144 may be used for analyzing time-based data trends, enabling the system to detect patterns, anomalies, or correlations by evaluating event data 112 within specific time spans. The system may dynamically adjust the temporal range 144 based on user preferences, real-time conditions, or external triggers, ensuring adaptability and responsiveness.

With continued reference to FIG. 1, as used in this disclosure, a "replacement private key" is a cryptographic key generated to substitute a previously issued private key 122 that has been lost, compromised, expired, or otherwise rendered invalid. The replacement private key 146 may be associated with the same public key 120 or a newly generated unique key pair, depending on the security protocol and system requirements. In an embodiment, the replacement private key 146 may be issued through a key recovery process, which may involve identity verification, authentication, and cryptographic procedures to ensure continuity of secure communications, digital signatures, or access control mechanisms. The replacement private key 146 may be securely distributed to the authorized entity and integrated into the system to restore functionality while mitigating unauthorized access risks.

With continued reference to FIG. 1, in an embodiment, the circuitry 102 may receive a compromised alert 136 indicating that the private key 122 associated with the first unique identity 108, such as a cloud service administrator's digital identity, has been exposed. The circuitry 102 may revoke the compromised private key 122 from a second unique identity 140, such as a secondary administrator account that maintains temporary access permissions over a defined temporal range 144, such as a 24-hour emergency access window. Without limitation, the replacement private key 146 may be generated and securely assigned to the first unique identity 108, ensuring continuity of administrative access while mitigating security risks. In another embodiment, the circuitry 102 may detect unauthorized access to the first unique identity 108 account, triggering a compromised alert 136. The circuitry 102 may revoke the private key 122 associated with the second unique identity 140, such as a linked merchant account that had a valid transactional relationship 142 with the first unique identity 108. The circuitry 102 may generate a replacement private key 146 for the first unique identity 108 and securely reassign it to restore secure access while preventing further unauthorized transactions.

With continued reference to FIG. 1, in addition to revoking access, the circuitry 102 may evaluate geographical data to determine whether the first unique identity 108 is likely to be engaged in the event associated with the key usage. This may include comparing real-time geolocation data to verify whether the individual is within a reasonable proximity to the location where the private key 122 is being used or analyzing recent location history to assess whether their movement pattern suggests they could feasibly be at that location. If the system detects a geographical inconsistency, such as a key being used in a location that does not align with the entity's expected movements, it may trigger additional security measures, including requiring multi-factor authentication, generating an anomaly alert, or immediately revoking access. The use of geolocation-based verification may enhance security by providing contextual awareness around private key 122 usage while allowing for adaptive authentication based on real-world movement patterns. Further clarification may be beneficial regarding how geolocation data is collected, how thresholds for security triggers are determined, and how privacy considerations are addressed when using location-based authentication.

With continued reference to FIG. 1, in an embodiment, deriving the location datum of a remote device may include using internet protocol (IP) geolocation. IP geolocation, as used in this disclosure, is a mapping of IP addresses and/or media access control (MAC) addresses to particular and/or approximate geographical locations. A computing device may look up the particular and/or approximate geographical location of the remote device upon receiving an IP and/or MAC address of the remote device and/or of a modem, server, wireless communication hub, or other device by means of which the remote device is transmitting data. Alternatively or additionally, a computing device may determine an approximate location of the remote device by measuring network communication latency. For instance, if responses from the remote device are received within a threshold amount of time, the remote device may be determined to be within some maximal radius from the computing device and/or from a modem, server, wireless communication hub, or other device by means of which the remote device is transmitting data. A computing device may alternatively or additionally store and/or look up geographical locations associated with device fingerprint data, including fingerprint data of the remote device, intermediary devices, or the like, where intermediary devices are defined as any devices by means of which the remote device is transmitting data, such as a modem, server, wireless communication hub, or other similar device. Intermediary devices may alternatively or additionally provide their geographic data, which may be used to estimate a location of the remote device. For instance, network communication latency may be used to estimate a distance from an intermediary device to the remote device, and/or an intermediary device may communicate with the remote device using local types of transmission, such as if the intermediary device is a Wi-Fi hub, cell tower, or the like.

With continued reference to FIG. 1, a computing device may be configured to determine a remote device identifier. A device identifier, as used in this disclosure, is any element of data that identifies a remote device and/or a user thereof, including without limitation a MAC address, a serial number, a globally unique identifier (GUID), a universally unique identifier (UUID), a username, one or more user login credentials such as passwords, tokens, or the like, and/or any other element suitable to identify a device and/or user thereof as described herein.

With continued reference to FIG. 1, determining a remote device identifier may include identifying device fingerprint data of the remote device and determining the device identifier from the device fingerprint data. Device fingerprint data, as used in this disclosure, is data used to determine a probable identity of a device as a function of at least a field parameter in a communication from the device. A field parameter may be any specific value set by the remote device and/or user thereof for any field regulating exchange of data according to protocols for electronic communication. As a non-limiting example, a field parameter may include a settings parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, PRIORITY, and/or similar frames or fields in HTTP/2 or other versions of HTTP or other communication protocols. Additional fields that may be used include browser settings such as the user-agent header of a browser, an accept-language header, a session age representing a number of seconds from time of creation of a session to the time of a current transaction or communication, a session ID, a transaction ID, and the like. Determining the identity of the remote device may include fingerprinting the remote device as a function of at least a machine operation parameter described in a communication received from the remote device. A machine operation parameter, as used herein, may include a parameter describing one or more metrics or parameters of performance for a device and/or incorporated or attached components. A machine operation parameter may include, without limitation, clock speed, monitor refresh rate, hardware or software versions of, for instance, components of the remote device, a browser running on the remote device, or the like, or any other parameters of machine control or action available in at least a communication. In an embodiment, a plurality of such values may be assembled to identify the remote device and distinguish it from other devices.

With continued reference to FIG. 1, determining the remote device identifier may include receiving a digital signature from the remote device and determining the device identifier from the digital signature. A digital signature, as used herein, includes a secure proof of possession of a secret by a signing device, as performed on a provided element of data, known as a message. A message may include an encrypted mathematical representation of a file or other set of data using the private key of a public key cryptographic system. Secure proof may include any form of secure proof as described above, including without limitation encryption using a private key of a public key cryptographic system. A signature may be verified using a verification datum suitable for verification of a secure proof. For instance, where secure proof is enacted by encrypting a message using a private key of a public key cryptographic system, verification may include decrypting the encrypted message using the corresponding public key and comparing the decrypted representation to a purported match that was not encrypted. If the signature protocol is well-designed and implemented correctly, this means the ability to create the digital signature is equivalent to possession of the private decryption key and/or a device-specific secret. Likewise, if a message making up a mathematical representation of a file is well-designed and implemented correctly, any alteration of the file may result in a mismatch with the digital signature. The mathematical representation may be produced using an alteration-sensitive, reliably reproducible algorithm, such as a hashing algorithm as described above. A mathematical representation to which the signature may be compared may be included with the signature for verification purposes. In other embodiments, the algorithm used to produce the mathematical representation may be publicly available, permitting easy reproduction of the mathematical representation corresponding to any file.

Still viewing FIG. 1, in some embodiments, digital signatures may be combined with or incorporated into digital certificates. In one embodiment, a digital certificate is a file that conveys information and links the conveyed information to a certificate authority that is the issuer of a public key in a public key 120 cryptographic system. A certificate authority in some embodiments contains data conveying the certificate authority's authorization for the recipient to perform a task. The authorization may be to access a given datum or process. In some embodiments, the certificate may identify the certificate authority. The digital certificate may include at least a digital signature 116.

With continued reference to FIG. 1, in some embodiments, the third-party entity 128 such as a certificate authority (CA) may verify that the possessor of the private key 122 is a particular entity. Thus, if the certificate authority is trusted, and the private key 122 has not been stolen, the ability of an entity to produce a digital signature 116 may confirm the identity of the entity and link the file to the entity in a verifiable way.

Still referring to FIG. 1, determining the remote device identifier may include receiving a token issued by one or more third-party devices or services identifying and/or authenticating the remote device and/or a user thereof, such as without limitation a Security Assertions Markup Language (SAML) token from the remote device and determining the device identifier from the SAML token.

Continuing to refer to FIG. 1, a computing device is configured to compare data to at least a memory map index. A memory map index, as used herein, is an element of data usable to look up a record stored in a memory map, which may include any data structure such as a database used for data storage and retrieval. A computing device is configured to retrieve at least a memory entry linked to the memory map index.

With continued reference to FIG. 1, the attestation metrics 134 may include a verification datum 148 from the plurality of connected digital identities 138. As used in this disclosure, a "verification datum" is a piece of data used to authenticate a unique identity. Without limitation, the verification datum 148 may be a singular data point or a combination of multiple data elements that contribute to a verification process. In an embodiment, the verification datum 148 may include biometric information, such as a fingerprint scan or facial recognition data, to authenticate the unique identity accessing a secure system. The verification datum 148 may also include cryptographic elements, such as a digital signature 116 or certificate, to validate the authenticity of a transmitted message. Additionally and or alternatively, the verification datum 148 may include time-sensitive tokens, such as a one-time password (OTP), to grant temporary access to a restricted resource. Other examples of the verification datum 148 may include a government-issued identification number, a blockchain transaction hash confirming asset ownership, or a GPS coordinate used to verify the location of an entity within a geofencing system. The verification datum 148 may be dynamically generated, stored, and processed based on system requirements to ensure secure and reliable authentication.

With continued reference to FIG. 1, attesting the first unique identity 108 may include a multi-factor verification process 150, wherein the multi-factor verification process 150 comprises one or more of biometric authentication 152, cryptographic key validation 154, and verification using the plurality of connected digital identities 138. As used in this disclosure, a "multi-factor verification process" is a security procedure that requires a unique identity to provide multiple independent verification data points to authenticate identity. The multi-factor verification process 150 may enhance security by combining different categories of authentication factors, such as knowledge-based factors like passwords or PINs, possession-based factors like cryptographic tokens or mobile devices, and inherence-based factors such as biometric data like fingerprints or facial recognition. In an embodiment, the multi-factor verification process 150 may involve a user entering a password as the first factor, receiving a one-time password (OTP) on a registered mobile device as the second factor, and confirming identity through a biometric scan as the third factor. Another embodiment may include verifying a financial transaction by requiring a digital signature 116, a mobile authentication prompt, and a secondary confirmation from an email or SMS link. The multi-factor verification process 150 may ensure that access or approval is granted only when multiple, independent authentication elements align, reducing the risk of unauthorized access due to compromised credentials.

With continued reference to FIG. 1, as used in this disclosure, "biometric authentication" is a security process that verifies an identity of a unique identity based on unique physiological or behavioral characteristics. Biometric authentication 152 utilizes biometric data, such as fingerprints, facial features, iris patterns, voiceprints, typing dynamics, and the like to grant access to a system, authorize a transaction, or confirm identity in a secure manner. In an embodiment, biometric authentication 152 may involve scanning a user's fingerprint to unlock a secure device, comparing facial recognition data against stored biometric profiles to permit access to a restricted area, or analyzing voice patterns to authenticate a remote user during a phone-based transaction. The biometric authentication 152 process may leverage machine learning algorithms, cryptographic security measures, and liveness detection techniques to prevent spoofing attempts and ensure accurate verification.

With continued reference to FIG. 1, as used in this disclosure, "cryptographic key validation" is a process that verifies the authenticity of a cryptographic key before its use in cryptographic operations. The cryptographic key validation 154 may involve checking the key's format, structure, and compliance with cryptographic standards, as well as confirming its association with a trusted entity or certificate authority. In an embodiment, the cryptographic key validation 154 may include verifying the mathematical properties of a public-private key pair to ensure consistency, checking a digital certificate's validity through a certificate authority (CA) and its revocation status via a certificate revocation list (CRL) or online certificate status protocol (OCSP), or performing a hash-based integrity check on a symmetric key before use in secure communications. The cryptographic key validation 154 process may provide that only legitimate, uncompromised keys are used, thereby enhancing the security and reliability of cryptographic systems.

With continued reference to FIG. 1, the verification process may leverage the plurality of connected digital identities 138 by cross-referencing relationships. For example, the circuitry 102 may confirm the first unique identity 108 through previously authenticated entities, analyzing historical interactions, or validating credentials linked to known devices. Without limitation, by integrating multiple verification methods, the apparatus 100 ensures a highly secure and reliable attestation process, reducing the risk of unauthorized access or identity fraud.

With continued reference to FIG. 1, the at least a circuitry 102 may be further configured to establish a decentralized reputation model 156 for the first unique identity 108, wherein the decentralized reputation model 156 is based on historical event data 158 with the plurality of connected digital identities 138 and dynamically modify the decentralized reputation model 156 as one or more of new attestations 160 and revocations 162 are recorded on the public ledger 124. As used in this disclosure, a "decentralized reputation model" is a system for evaluating and maintaining credibility assessments of one or more unique identities 110 without relying on a central authority. Instead, the decentralized reputation model 156 distributes reputation data across a network of nodes, using consensus mechanisms, cryptographic verification, or blockchain technology to ensure transparency, security, and resistance to manipulation. In an embodiment, the decentralized reputation model 156 may aggregate peer-reviewed ratings, historical transaction records, or behavioral data to generate a reputation score for a user, device, or organization. For example, in a decentralized identity framework, the reputation of a unique identity may be built based on verified interactions with multiple trusted parties, where each interaction contributes to a weighted trust score. In another embodiment, a blockchain-based marketplace where sellers' reputations are determined by smart contract-verified transactions and customer feedback stored on an immutable ledger. The decentralized reputation model 156 may enhance authenticity while minimizing risks associated with single points of failure, bias, or centralized data breaches.

With continued reference to FIG. 1, as used in this disclosure, "historical event data" is a collection of recorded occurrences associated with a unique identity over a period of time. Historical event data 158 may include timestamps, metadata, authentication records, transaction logs, security events, or any other verifiable data points that provide context for past activities. In an embodiment, historical event data 158 may be utilized to assess the authenticity of a digital identity 132 by analyzing prior successful authentications, recorded attestations, or behavioral patterns within a decentralized network. For example, in the decentralized reputation model 156, historical event data 158 may include previous verifications from trusted entities, past revocations 162 due to security incidents, or the frequency and nature of interactions with other connected digital identities 138. The historical event data 158 may be securely stored in the public ledger 124, enabling transparency, integrity, and real-time updates to trust models or identity validation processes. As used in this disclosure, "metadata" is data that provides information about other data to facilitate processing. Metadata may include attributes such as timestamps, file size, data format, access permissions, origin details, or any other information that characterizes the primary data. In an embodiment, metadata may be used to enhance data retrieval and security by tagging digital identities with verification timestamps, cryptographic signatures, or access control parameters. For example, in a decentralized reputation model 156, metadata may include the source of an attestation, the entities involved in a verification event, and the conditions under which the event occurred. Additionally and or alternatively, metadata may be utilized in cryptographic processes, such as embedding key usage policies within a digital certificate or associating audit logs with specific transactions. Without limitation, the metadata may provide structured information about data and enable efficient data management, traceability, and enhanced security within digital ecosystems.

With continued reference to FIG. 1, wherein establishing the digital identity 132 of the first unique identity 108 may include transmitting, using the at least a circuitry 102, the attestation input 106 of the first unique identity 108 to evaluation nodes 164, reviewing, using the evaluation nodes 164, the attestation input 106 associated with the first unique identity 108, and conditionally establishing, using the evaluation nodes 164, the digital identity 132 of the first unique identity 108 as a function of a plurality of evaluation parameters 166.

With continued reference to FIG. 1, the at least a circuitry 102 may be further configured to generate a score 168 for the first unique identity 108 as a function of the attestation metrics 134 and feedback 170 and dynamically update the score 168 using the event data 112 and the feedback 170. As used in this disclosure, a "score" is a numerical value assigned to a unique identity based on an evaluation of predefined parameters. The score 168 may represent a measurement of trust, reputation, risk, performance, or compliance within a system. The score 168 may be dynamically updated based on real-time or historical data. In an embodiment, the score 168 may be used in a decentralized reputation model 156 to quantify the credibility of a digital identity 132 by analyzing past interactions, verification attestations, and security-related events. For example, without limitation, a higher score 168 may indicate a history of successful authentications and positive endorsements from trusted entities, whereas a lower score 168 may reflect revocations 162, failed verifications, or suspicious activity. Additionally and or alternatively, the score 168 may be weighted based on evaluation parameters 166 such as the reliability of the verifying entity, the frequency of transactions, or the severity of past security incidents. In an embodiment, by utilizing a score 168, the apparatus 100 may efficiently assess and compare unique identities 110, enabling automated decision-making, risk assessment, and access control within digital ecosystems.

With continued reference to FIG. 1, as used in this disclosure, "feedback" is information provided in response to an event associated with a unique identity and or digital identity 132. In an embodiment, the feedback 170 may be used to assess validate authenticity of the first unique identity 108 and or the digital identity 132. The feedback 170 may be qualitative or quantitative and may originate from users, systems, or automated evaluation mechanisms. In an embodiment, the feedback 170 may be used in the decentralized reputation model 156 to update the score 168 of the first unique identity 108 based on attestations, revocations 162, or interactions with other unique identities 110. For example, without limitation, in a peer-to-peer verification system, the feedback 170 may include ratings, endorsements, or dispute resolutions that contribute to an entity's overall reputation. Additionally and or alternatively, the feedback 170 may be incorporated into machine learning algorithms to enhance security measures, detect anomalies, or refine evaluation parameters 166. Without limitation, by leveraging the feedback 170, the apparatus 100 may adapt dynamically, improve accuracy, and ensure a more robust assessment of entities and transactions.

With continued reference to FIG. 1, in an embodiment, the score 168 may represent a trust or reputation value assigned to the first unique identity 108 based on various verification factors, including the frequency and reliability of past attestations, endorsements from connected digital identities 138, and historical authentication success rates. The apparatus 100 may initially compute the score 168 using attestation metrics 134, such as the number of successful identity verifications and the credibility of verifying entities, along with feedback 170 received from other network participants. Continuing, as new event data is recorded, such as successful transactions, security breaches, or policy violations, the score 168 may be recalibrated in real time to reflect the evolving status of the first unique identity 108. Additionally and or alternatively, user feedback 170, including ratings, dispute resolutions, or behavioral patterns, may contribute to continuous score 168 adjustments. For example, without limitation, if a previously trusted entity revokes an attestation due to a detected compromise, the score 168 may decrease to reflect the increased risk associated with the first unique identity 108. Conversely, if multiple trusted entities confirm the legitimacy of the unique identity over time, the score 168 may improve, enhancing its credibility within the apparatus 100. Continuing, by dynamically updating the score 168 based on real-time inputs, the apparatus 100 may ensure that trust assessments remain accurate, adaptive, and resistant to manipulation.

With continued reference to FIG. 1, authentication token may include a time-varying credential, which may have a time limit after which time-varying credential is no longer valid. Time limit may be calculated from an initial time, which may be a datum linked to a particular timestamp or other value representing a fixed moment in time, associated with time-varying credential; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

With continued reference to FIG. 1, performing a trusted time evaluation of an identity verification request may include performing a trusted time evaluation of attestation data by a computing device. As a non-limiting example, secure proof may be generated using a secure timestamp. Generating the secure timestamp may include digitally signing the secure timestamp using any digital signature 116 protocol as described above. In one embodiment, authenticity of received data signals is established by utilizing a chain of attestation via one or more attestation schemes (in a non-limiting example, via direct anonymous attestation (DAA)) to verify that a cryptographic key is an authentic cryptographic key that has the property of attested time. Generating a secure timestamp may be used to weed out spoofers or "man-in-the-middle" attacks.

Still referring to FIG. 1, a secure timestamp may record the current time in a hash chain. In an embodiment, a hash chain includes a series of hashes, each produced from a message containing a current timestamp (i.e., current at the moment the hash is created) and the previously created hash, which may be combined with one or more additional data points; additional data may include a random number, which may be generated, for instance, using a cryptographic random number generator. Additional data may include one or more additional data points, including device authentication logs, that are received by circuitry 102. Additional data may be hashed into a Merkle tree or other hash tree, such that a root of the hash tree may be incorporated in an entry in the hash chain. It may be computationally infeasible to reverse-hash any one entry, particularly in the amount of time during which its currency is important; it may be astronomically difficult to reverse-hash the entire chain, rendering illegitimate or fraudulent timestamps referring to the hash chain all but impossible. A purported entry may be evaluated by hashing its corresponding message.

In an embodiment, the trusted timestamping procedure utilized is substantially similar to the RFC 3161 standard. In this scenario, the received data signals are locally processed at the listener device by a one-way function, e.g., a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g., cryptographic credentials, along with the local timestamp of the device. Attested time may additionally incorporate attested identity, attested device architecture, and other pieces of information identifying properties of the attesting device.

In one embodiment, a secure timestamp is generated by a trusted third party (TTP) that appends a timestamp to the hashed output data, applies the TSA private key to sign the hashed output data concatenated to the timestamp, and returns this signed, a.k.a. trusted timestamped data, back to the listener device. Alternatively, or additionally, one or more additional participants, such as other verifying nodes, may evaluate the secure timestamp, the entity generating the secure timestamp, and/or perform threshold cryptography with a plurality of such parties, each of which may have performed an embodiment of a method to produce a secure timestamp.

In an embodiment, a distributed ledger or other secure data store authenticating digitally signed assertions, devices, and/or user credentials may perform authentication at least in part by evaluating the timeliness of entry and/or generation data as assessed against the secure timestamp. In an embodiment, secure proof is generated using an attested computing protocol; this may be performed, as a non-limiting example, using any protocol for attested computing as described above.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
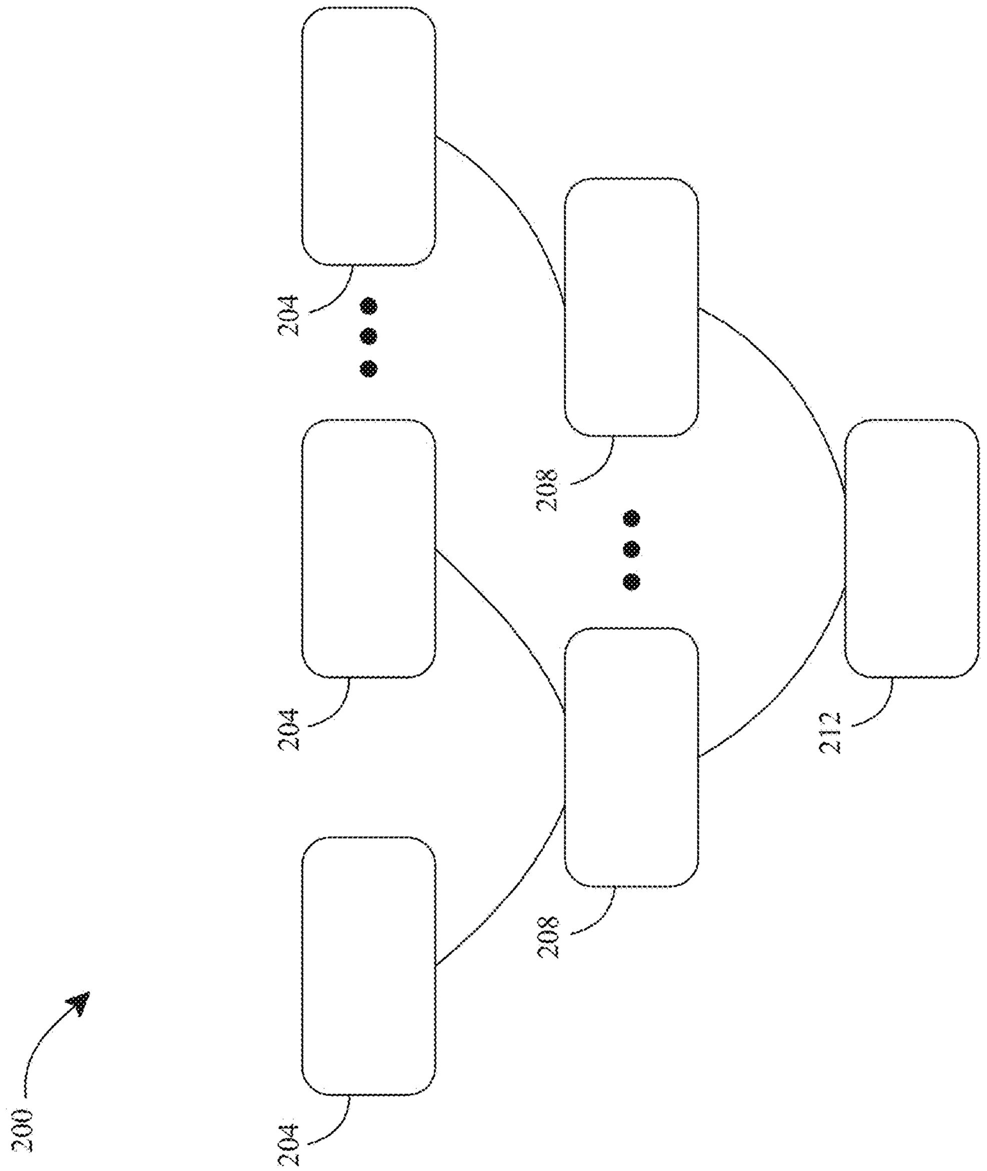
FIG. 2 is a diagram of an exemplary embodiment of a cryptographic accumulator.

Referring now to FIG. 2, an exemplary embodiment of a cryptographic accumulator 200 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 200 has a plurality of accumulated elements 204, each accumulated element 204 generated from a lot of the plurality of data lots. Accumulated elements 204 are create using an encryption process, defined for this purpose as a process that renders the lots of data unintelligible from the accumulated elements 204; this may be a one-way process such as a cryptographic hashing process and/or a reversible process such as encryption. Cryptographic accumulator 200 further includes structures and/or processes for conversion of accumulated elements 204 to root 212 element. For instance, and as illustrated for exemplary purposes in FIG. 2 cryptographic accumulator 200 may be implemented as a Merkle tree and/or hash tree, in which each accumulated element 204 created by cryptographically hashing a lot of data. Two or more accumulated elements 204 may be hashed together in a further cryptographic hashing process to produce a node 208 element; a plurality of node 208 elements may be hashed together to form parent nodes 208, and ultimately a set of nodes 208 may be combined and cryptographically hashed to form root 212. Contents of root 212 may thus be determined by contents of nodes 208 used to generate root 212, and consequently by contents of accumulated elements 204, which are determined by contents of lots used to generate accumulated elements 204. As a result of collision resistance and avalanche effects of hashing algorithms, any change in any lot, accumulated element 204, and/or node 208 is virtually certain to cause a change in root 212; thus, it may be computationally infeasible to modify any element of Merkle and/or hash tree without the modification being detectable as generating a different root 212. In an embodiment, any accumulated element 204 and/or all intervening nodes 208 between accumulated element 204 and root 212 may be made available without revealing anything about a lot of data used to generate accumulated element 204; lot of data may be kept secret and/or demonstrated with a secure proof as described below, preventing any unauthorized party from acquiring data in lot.

Alternatively or additionally, and still referring to FIG. 2, cryptographic accumulator 200 may include a "vector commitment" which may act as an accumulator in which an order of elements in set is preserved in its root 212 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 200 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Referring now to FIG. 3, an exemplary embodiment of an immutable sequential listing 300 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Data elements are listed in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 1XX records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Referring now to FIG. 4A-E, exemplary embodiments 400*a-e* of a graphical user interface with at least a visual element associated with a digital identity. In an embodiment, the graphical user interface may include a SureMark system dynamic verification process, where the SureMark logo may visually update based on the authentication status of digital content. In an embodiment, the logo, located in the toolbar, may serve as an immediate trust indicator, adapting in real time to reflect content authenticity. In another embodiment, in its default state, the SureMark logo may appear as "/S/" when no verification status has been determined. Without limitation, the neutral indicator may allow users to recognize that the content has yet to undergo authentication processing. Continuing, once the system detects and verifies authorized content, the logo may dynamically update to a check mark, signifying that the content has been validated through an attestation process, which may include cryptographic proof and endorsement data. Continuing, upon user interaction, clicking the SureMark logo may present a detailed authentication interface, displaying verification metadata such as the verified source, cryptographic signatures, attestations, and additional contextual data supporting the authenticity of the content. Without limitation, this information may be structured to allow users to quickly assess the credibility of the verification while maintaining transparency. Without limitation, if content is flagged as unauthorized or unverified, the SureMark logo may update to a question mark, signaling that the content lacks proper authentication or has been flagged due to inconsistencies. Continuing, the visual warning may alert users to exercise caution, prompting them to review the associated verification details before relying on the content. In an embodiment, in addition to individual content authentication, the system may support a decentralized reputation validation mechanism. Without limitation, within a directory, users may view instances where multiple individuals cross-sign to endorse each other, reinforcing the credibility of content through networked attestations. The endorsement process may allow digital identities with established reputations to verify and confirm content authenticity, ensuring a more robust and reliable trust framework. This verification process may provide a seamless and transparent mechanism for digital content authentication, allowing users to assess trustworthiness at a glance while also accessing more granular verification details as needed.

Figure 5:
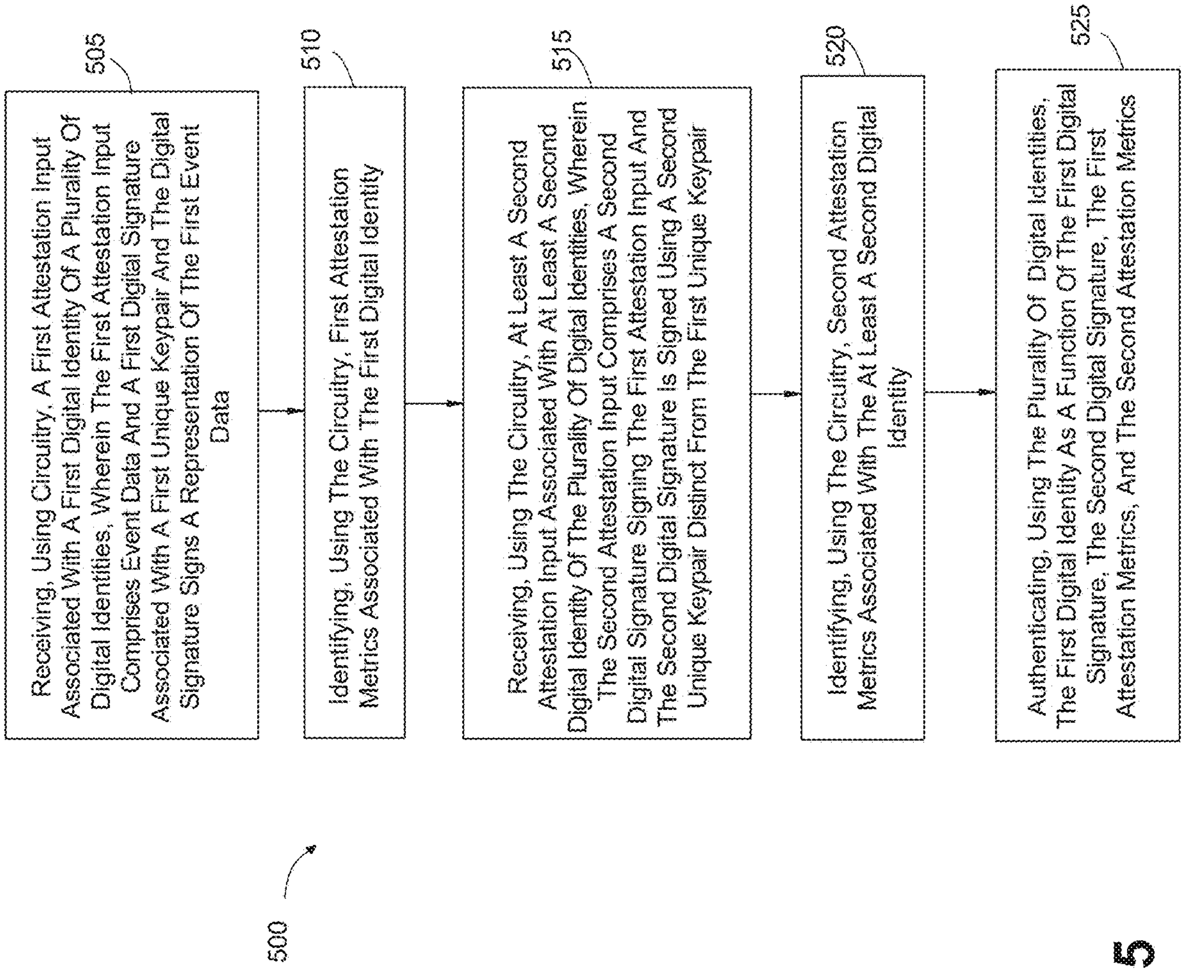
FIG. 5 is a block diagram of an exemplary method for establishing a digital identity as a function of at least a digital signature and attestation metrics.

Referring now to FIG. 5, a flow diagram of an exemplary method 500 for establishing a digital identity as a function of at least a digital signature and attestation metrics is illustrated. At step 505, method 500 includes receiving, using circuitry, a first attestation input associated with a first digital identity of a plurality of digital identities, wherein the first attestation input comprises event data and a first digital signature associated with a first unique keypair and the digital signature signs a representation of the first event data. In an embodiment, the representation of the event data may be a cryptographic accumulation of the event data. In an embodiment, receiving the first attestation input further may include receiving a posting of the first attestation input on an immutable sequential listing. In an embodiment, the circuitry may be configured to post the event data on an immutable sequential listing. This may be implemented as described and with reference to FIGS. 1-4.

Still referring to FIG. 5, at step 510, method 500 includes a identifying, using the circuitry, first attestation metrics associated with the first digital identity. This may be implemented as described and with reference to FIGS. 1-4.

Still referring to FIG. 5, at step 515, method 500 includes receiving, using the circuitry, at least a second attestation input associated with at least a second digital identity of the plurality of digital identities, wherein the second attestation input comprises a second digital signature signing the first attestation input and the second digital signature is signed using a second unique keypair distinct from the first unique keypair. In an embodiment, authenticating the first identity further may include recursively authenticating the at least a second digital identity by authenticating at least a third attestation input signing the second attestation data and authenticating the at least a second digital identity using at least a third attestation input. In an embodiment, the circuitry may be configured to establish a decentralized reputation model for the first unique identity, wherein the decentralized reputation model is based on historical event data with a plurality of connected digital identities and modify the decentralized reputation model based on the first attestation input and the second attestation input. In an embodiment, the circuitry may be configured to sign the first attestation input using a third unique keypair associated with the circuitry. This may be implemented as described and with reference to FIGS. 1-4.

Still referring to FIG. 5, at step 520, method 500 includes identifying, using the circuitry, second attestation metrics associated with the at least a second digital identity. This may be implemented as described and with reference to FIGS. 1-4.

Still referring to FIG. 5, at step 525, method 500 includes authenticating, using the plurality of digital identities, the first digital identity as a function of the first digital signature, the second digital signature, the first attestation metrics, and the second attestation metrics. In an embodiment, the circuitry may be configured to display, using a graphical user interface, an authentication result, wherein the authentication result comprises at least a visual element, wherein the at least a visual element indicates a verification status of the first digital identity. In an embodiment, authenticating the first digital identity may include transmitting, using the circuitry, the first attestation metrics of the first digital identity to at least an evaluation node, wherein each evaluation node of the at least an evaluation node comprises a unique node keypair, the unique node keypair comprising a private node key and a public node key, receiving, from each of the at least an evaluation node, a node signature signed using a corresponding private node key, and authenticating the first digital identity based on the node signature. In an embodiment, the circuitry may be further configured to generate a score for the first digital identity as a function of the attestation metrics and feedback and dynamically update the score using the event data and the feedback. This may be implemented as described and with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
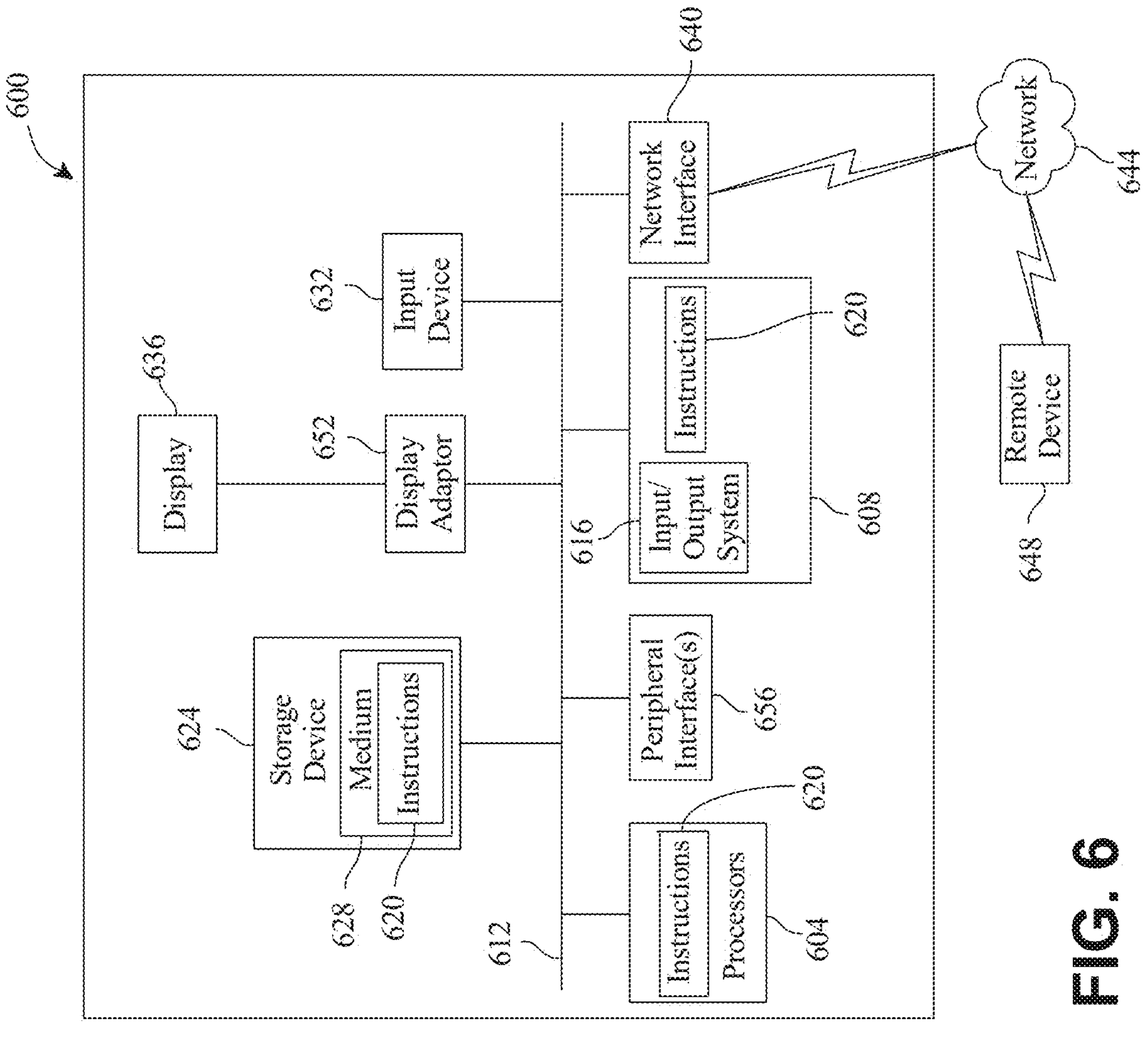
FIG. 6 is a block diagram of a computing system that can be used to implement any one or more of the methodologies disclosed herein and any one or more portions thereof.

FIG. 6 shows a diagrammatic representation of one embodiment of computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for establishing a digital identity as a function of at least a digital signature and attestation metrics, wherein the apparatus comprises circuitry configured to:

receive a first attestation input associated with a first digital identity of a plurality of digital identities, wherein:

the first attestation input comprises event data and a first digital signature associated with a first unique keypair; and the digital signature signs a representation of the first event data;

identify first attestation metrics associated with the first digital identity;

receive at least a second attestation input associated with at least a second digital identity of the plurality of digital identities, wherein:

the second attestation input comprises a second digital signature signing the first attestation input; and the second digital signature is signed using a second unique keypair distinct from the first unique keypair;

identify second attestation metrics associated with the at least a second digital identity;

authenticating the first digital identity as a function of the first digital signature, the second digital signature, the first attestation metrics, and the second attestation metrics, wherein authenticating the first digital identity comprises:

transmitting, using the circuitry, the first attestation metrics of the first digital identity to at least an evaluation node, wherein each evaluation node of the at least an evaluation node comprises a unique node keypair, the unique node keypair comprising a private node key and a public node key;

receiving, from each of the at least an evaluation node, a node signature signed using a corresponding private node key; and authenticating the first digital identity based on the node signature.

2. The apparatus of claim 1, wherein authenticating the first identity further comprises recursively authenticating the at least a second digital identity by:

authenticating at least a third attestation input signing the second attestation data; and authenticating the at least a second digital identity using at least a third attestation input.

3. The apparatus of claim 1, wherein the circuitry is configured to display, using a graphical user interface, an authentication result, wherein the authentication result comprises at least a visual element, wherein the at least a visual element indicates a verification status of the first digital identity.

4. The apparatus of claim 1, wherein the representation of the event data is a cryptographic accumulation of the event data.

5. The apparatus of claim 1, wherein receiving the first attestation input further comprises receiving a posting of the first attestation input on an immutable sequential listing.

6. The apparatus of claim 1, wherein:

the circuitry is further configured to transmit, to a device associated with the first digital identity, a challenge; and the first attestation input further comprises a challenge response.

7. The apparatus of claim 1, wherein the circuitry is configured to sign the first attestation input using a third unique keypair associated with the circuitry.

8. The apparatus of claim 1, wherein the circuitry is configured to post the event data on an immutable sequential listing.

9. The apparatus of claim 1, wherein the circuitry is further configured to:

generate a score for the first digital identity as a function of the attestation metrics and feedback; and dynamically update the score using the event data and the feedback.

10. A method for establishing a digital identity as a function of at least a digital signature and attestation metrics, wherein the method comprises:

receiving, using circuitry, a first attestation input associated with a first digital identity of a plurality of digital identities, wherein:

the first attestation input comprises event data and a first digital signature associated with a first unique keypair; and the digital signature signs a representation of the first event data;

identifying, using the circuitry, first attestation metrics associated with the first digital identity;

receiving, using the circuitry, at least a second attestation input associated with at least a second digital identity of the plurality of digital identities, wherein:

the second attestation input comprises a second digital signature signing the first attestation input; and the second digital signature is signed using a second unique keypair distinct from the first unique keypair;

identifying, using the circuitry, second attestation metrics associated with the at least a second digital identity;

authenticating the first digital identity as a function of the first digital signature, the second digital signature, the first attestation metrics, and the second attestation metrics, wherein authenticating the first digital identity comprises:

transmitting, using the circuitry, the first attestation metrics of the first digital identity to at least an evaluation node, wherein each evaluation node of the at least an evaluation node comprises a unique node keypair, the unique node keypair comprising a private node key and a public node key;

receiving, from each of the at least an evaluation node, a node signature signed using a corresponding private node key; and authenticating the first digital identity based on the node signature.

11. The method of claim 10, wherein authenticating the first identity further comprises recursively authenticating the at least a second digital identity by:

authenticating at least a third attestation input signing the second attestation data; and authenticating the at least a second digital identity using at least a third attestation input.

12. The method of claim 10, wherein the circuitry is configured to display, using a graphical user interface, an authentication result, wherein the authentication result comprises at least a visual element, wherein the at least a visual element indicates a verification status of the first digital identity.

13. The method of claim 10, wherein the representation of the event data is a cryptographic accumulation of the event data.

14. The method of claim 10, wherein receiving the first attestation input further comprises receiving a posting of the first attestation input on an immutable sequential listing.

15. The method of claim 10, wherein:

the circuitry is further configured to transmit, to a device associated with the first digital identity, a challenge; and the first attestation input further comprises a challenge response, the circuitry is further configured to transmit, to a device associated with the first digital identity, a challenge; and the first attestation input further comprises a challenge response.

16. The method of claim 10, wherein the circuitry is configured to sign the first attestation input using a third unique keypair associated with the circuitry.

17. The method of claim 10, wherein the circuitry is configured to post the event data on an immutable sequential listing.

18. The method of claim 10, wherein the circuitry is further configured to:

generate a score for the first digital identity as a function of the attestation metrics and feedback; and dynamically update the score using the event data and the feedback.

* * * * *